(12) United States Patent
Nakano et al.

(10) Patent No.: US 7,982,915 B2
(45) Date of Patent: Jul. 19, 2011

(54) INKJET RECORDING APPARATUS, IMAGE PROCESSING METHOD, STORAGE MEDIUM, PIGMENTED INK, AND RECORDED MATTER

(75) Inventors: Naoki Nakano, Kanagawa (JP); Masakazu Yoshida, Kanagawa (JP); Takashi Kimura, Kanagawa (JP); Masanori Hirano, Kanagawa (JP); Takahiro Ike, Tokyo (JP); Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 11/916,358

(22) PCT Filed: Apr. 3, 2007

(86) PCT No.: PCT/JP2007/057802
§ 371 (c)(1),
(2), (4) Date: Dec. 3, 2007

(87) PCT Pub. No.: WO2007/114527
PCT Pub. Date: Oct. 11, 2007

(65) Prior Publication Data
US 2009/0080002 A1    Mar. 26, 2009

(30) Foreign Application Priority Data

Apr. 4, 2006  (JP) ................................. 2006-103139
Mar. 30, 2007  (JP) ................................. 2007-092191

(51) Int. Cl.
*H04N 1/40*  (2006.01)
*H04N 1/405*  (2006.01)

(52) U.S. Cl. ..................... 358/3.01; 358/3.18; 358/3.16; 358/3.26

(58) Field of Classification Search .................. 358/3.01, 358/3.18, 3.16, 445, 3.26, 524; 428/34.2
See application file for complete search history.

(56) References Cited

U.S. PATENT DOCUMENTS 4,977,458 A * 12/1990 Granger et al. ............... 358/3.26
5,175,031 A * 12/1992 Ochocki ....................... 428/34.2
(Continued)

FOREIGN PATENT DOCUMENTS

CN            1159154 C        7/2004
(Continued)

OTHER PUBLICATIONS

Aug. 21, 2009 Chinese official action (and English translation thereof) in connection with a counterpart Chinese patent application No. 2007800005450.

(Continued)

*Primary Examiner* — Charlotte M Baker
(74) *Attorney, Agent, or Firm* — Cooper & Dunham LLP

(57) ABSTRACT

A disclosed inkjet recording apparatus for performing recording by jetting a recording liquid onto a recording medium includes an image processing unit configured to obtain an output halftone level by performing halftone processing on input image data, to select a dot arrangement order according to the obtained output halftone level, and thereby to generate dot data where dots are arranged in a grid-like pattern. The disclosed inkjet recording apparatus is configured to use a pigmented ink as the recording liquid when the recording medium is a commercial printing paper, and to record the dots in a staggered arrangement where positions of the dots in odd/even-numbered columns or odd/even-numbered rows in the dot data are shifted in a sub-scanning direction or in a main-scanning direction.

16 Claims, 35 Drawing Sheets

U.S. PATENT DOCUMENTS

| | | | |
|---|---|---|---|
| 5,331,429 A * | 7/1994 | Levien | 358/3.18 |
| 5,400,065 A | 3/1995 | Tomono et al. | |
| 6,334,667 B1 | 1/2002 | Moon et al. | |
| 6,443,549 B1 | 9/2002 | Bitticker et al. | |
| 6,578,944 B1 | 6/2003 | Kamei et al. | |
| 6,659,589 B2 | 12/2003 | Hickman et al. | |
| 6,923,520 B2 | 8/2005 | Oikawa et al. | |
| 7,083,247 B2 | 8/2006 | Yoshida et al. | |
| 2006/0181562 A1 | 8/2006 | Hirano et al. | |
| 2007/0058201 A1 | 3/2007 | Ike et al. | |
| 2007/0064031 A1 | 3/2007 | Nakano et al. | |
| 2007/0085869 A1 | 4/2007 | Hirano et al. | |
| 2007/0091135 A1 | 4/2007 | Hosaka et al. | |
| 2007/0106962 A1 | 5/2007 | Sakakibara et al. | |

FOREIGN PATENT DOCUMENTS

| | | |
|---|---|---|
| CN | 1230475 C | 12/2005 |
| JP | 10-75275 | 3/1998 |
| JP | 2000-25211 | 1/2000 |
| JP | 2000-299783 | 10/2000 |
| JP | 2001-139849 | 5/2001 |
| JP | 2001-277556 | 10/2001 |
| JP | 2002-16802 | 1/2002 |
| JP | 2003-46777 | 2/2003 |
| JP | 2003-118098 | 4/2003 |
| JP | 2003-259118 | 9/2003 |
| JP | 2004-80065 | 3/2004 |
| JP | 2005-1221 | 1/2005 |
| JP | 2006-224653 | 8/2006 |
| WO | WO02/072720 A1 | 9/2002 |
| WO | WO2005/028206 A1 | 3/2005 |

OTHER PUBLICATIONS

Feb. 5, 2010 Chinese official action (with English translation) in connection with counterpart Chinese patent application No. 2007800005450.

* cited by examiner

FIG.13

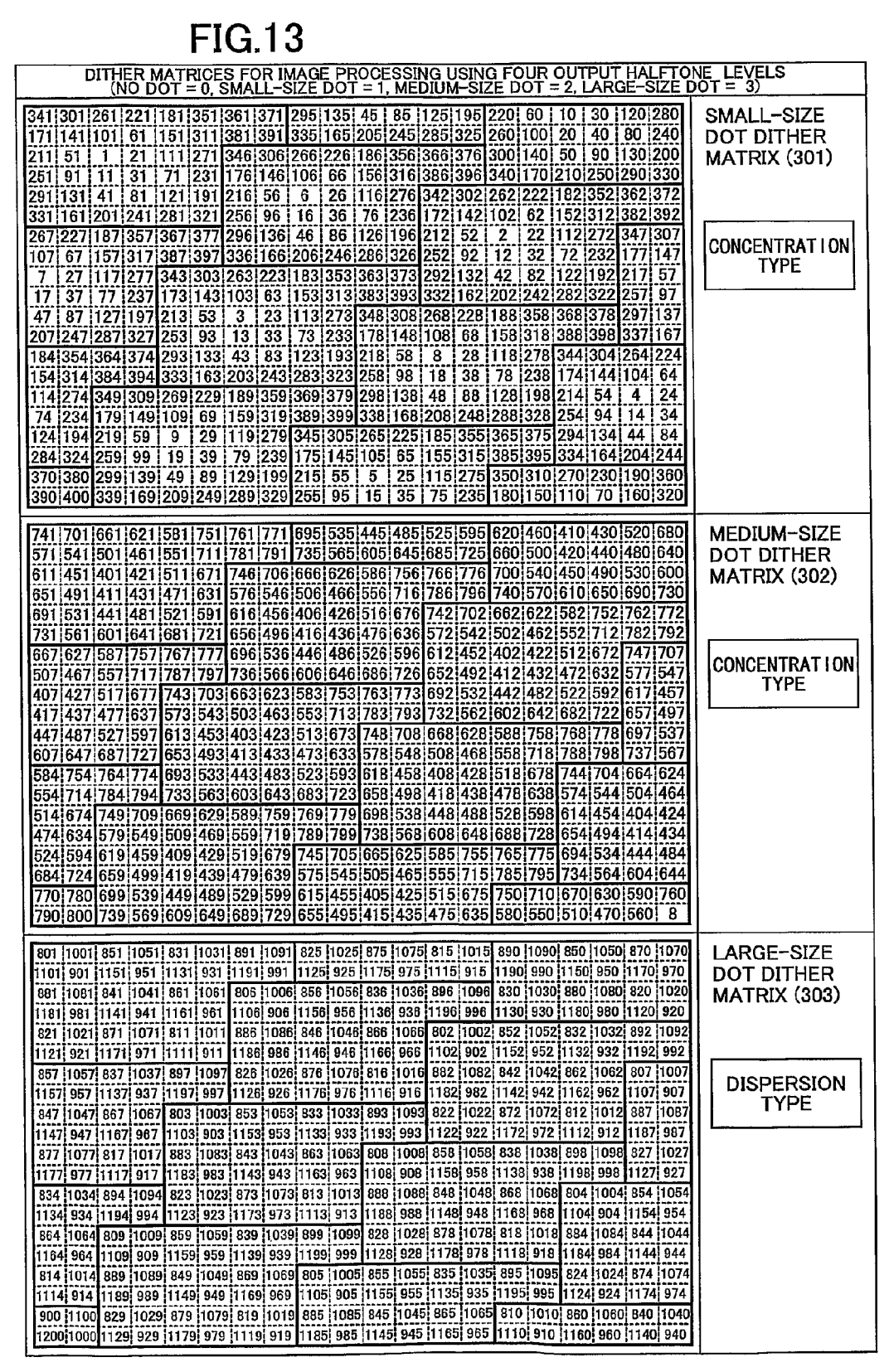

DITHER MATRICES FOR IMAGE PROCESSING USING FOUR OUTPUT HALFTONE LEVELS
(NO DOT = 0, SMALL-SIZE DOT = 1, MEDIUM-SIZE DOT = 2, LARGE-SIZE DOT = 3)

SMALL-SIZE DOT DITHER MATRIX (301) — CONCENTRATION TYPE

MEDIUM-SIZE DOT DITHER MATRIX (302) — CONCENTRATION TYPE

LARGE-SIZE DOT DITHER MATRIX (303) — DISPERSION TYPE

FIG.14

DITHER MATRIX (301)

SUBMATRIX (101)

| 341 | 301 | 261 | 221 | 181 | 351 | 361 | 371 | 295 | 135 | 45 | 85 | 125 | 195 | 220 | 60 | 10 | 30 | 120 | 280 |
|---|---|---|---|---|---|---|---|---|---|---|---|---|---|---|---|---|---|---|---|
| 171 | 141 | 101 | 1 | 151 | 311 | 381 | 391 | 335 | 165 | 205 | 245 | 285 | 325 | 260 | 100 | 140 | 40 | 80 | 240 |
| 211 | 51 | 21 | 11 | 111 | 271 | 346 | 306 | 266 | 226 | 186 | 356 | 366 | 376 | 300 | 140 | 20 | 90 | 130 | 200 |
| 251 | 91 | 31 | 41 | 71 | 231 | 176 | 146 | 106 | 66 | 156 | 316 | 386 | 396 | 340 | 170 | 50 | 250 | 290 | 330 |
| 291 | 131 | 81 | 121 | 191 | 216 | 56 | 6 | 26 | 116 | 276 | 342 | 302 | 262 | 222 | 182 | 210 | 352 | 362 | 372 |
| 331 | 161 | 201 | 241 | 281 | 321 | 256 | 96 | 16 | 36 | 86 | 236 | 172 | 142 | 102 | 62 | 22 | 112 | 382 | 392 |
| 267 | 227 | 187 | 357 | 367 | 377 | 296 | 136 | 46 | 126 | 196 | 212 | 52 | 2 | 12 | 32 | 152 | 272 | 347 | 307 |
| 107 | 67 | 157 | 317 | 387 | 397 | 336 | 166 | 206 | 246 | 286 | 326 | 252 | 92 | 42 | 82 | 112 | 232 | 177 | 147 |
| 7 | 27 | 117 | 277 | 343 | 303 | 263 | 223 | 183 | 353 | 363 | 373 | 292 | 132 | 2 | 12 | 72 | 192 | 217 | 57 |
| 17 | 37 | 77 | 237 | 173 | 143 | 103 | 63 | 153 | 313 | 383 | 393 | 332 | 162 | 202 | 242 | 122 | 272 | 257 | 97 |
| 47 | 87 | 127 | 197 | 213 | 53 | 3 | 23 | 113 | 273 | 348 | 308 | 268 | 228 | 188 | 358 | 282 | 232 | 297 | 137 |
| 207 | 247 | 287 | 327 | 253 | 93 | 13 | 33 | 73 | 233 | 178 | 148 | 108 | 68 | 158 | 318 | 322 | 368 | 337 | 167 |
| 184 | 354 | 364 | 374 | 293 | 133 | 43 | 83 | 123 | 193 | 218 | 58 | 8 | 28 | 118 | 278 | 344 | 304 | 264 | 224 |
| 154 | 314 | 384 | 394 | 333 | 163 | 203 | 243 | 283 | 323 | 258 | 98 | 18 | 38 | 78 | 238 | 174 | 144 | 104 | 64 |
| 114 | 274 | 349 | 309 | 269 | 229 | 189 | 359 | 369 | 379 | 298 | 138 | 48 | 88 | 128 | 198 | 214 | 54 | 4 | 24 |
| 74 | 234 | 179 | 149 | 109 | 69 | 29 | 159 | 319 | 389 | 399 | 338 | 168 | 208 | 248 | 288 | 328 | 254 | 94 | 14 | 34 |
| 124 | 194 | 219 | 59 | 9 | 19 | 39 | 89 | 279 | 345 | 305 | 265 | 225 | 185 | 355 | 365 | 375 | 294 | 134 | 44 |
| 284 | 324 | 259 | 99 | 19 | 49 | 129 | 239 | 199 | 175 | 145 | 105 | 65 | 155 | 315 | 385 | 395 | 334 | 164 | 204 | 84 |
| 370 | 380 | 339 | 169 | 209 | 249 | 289 | 329 | 215 | 55 | 5 | 25 | 115 | 275 | 350 | 310 | 270 | 230 | 190 | 360 | 244 |
| 390 | 400 | 284 | 324 | 169 | 209 | 249 | 329 | 255 | 95 | 15 | 35 | 75 | 235 | 180 | 150 | 110 | 70 | 160 | 320 |

FIG.15

| | CONCENTRATION TYPE (201) | DISPERSION TYPE (202) |
|---|---|---|
| 1 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 2 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 3 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 4 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 5 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| ⋮ | (OMITTED) | (OMITTED) |
| 40 | 34 30 26 22 18 35 36 37<br>17 14 10 6 15 31 38 39<br>21 5 0 2 11 27<br>25 9 1 3 7 23<br>29 13 4 8 121 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |

|   | 1 | 2 | 3 | 4 |
|---|---|---|---|---|
| 1 |   |   |   |   |
| 2 |   |   |   |   |
| 3 |   |   |   |   |

INKJET RECORDING APPARATUS, IMAGE PROCESSING METHOD, STORAGE MEDIUM, PIGMENTED INK, AND RECORDED MATTER

TECHNICAL FIELD

This disclosure generally relates to an inkjet recording system for recording an image by jetting a recording liquid onto a recording medium, and more particularly relates to an inkjet recording apparatus, an image processing method, an ink, a storage medium containing an image processing program, and recorded matter in an inkjet recording system for recording a high-resolution, high-quality multivalued-image on a high-quality coated paper for commercial printing (commercial printing paper).

BACKGROUND ART

Inkjet printing papers are suitable to form high-quality images with an inkjet printer. However, inkjet printing papers are normally expensive and are therefore not suitable for high-volume printing.

On the other hand, high-quality coated papers for commercial printing (hereafter called commercial printing paper(s)) are of high quality as well as comparatively inexpensive, and are therefore suitable for high-volume printing.

However, since conventional dye inks and pigmented inks have low penetration capability, they are not easily fixed on such commercial printing papers. Therefore, it is difficult to form images on commercial printing papers with conventional dye inks and pigmented inks.

Meanwhile, when printing multivalued image data with, for example, a digital printer or a digital facsimile, dither methods are used to reproduce halftones using halftone levels fewer than original halftone levels. In a dither method, halftones are reproduced by a combination of density modulation (intensity modulation) and area coverage modulation.

In a binary dither method, the density value of a pixel at a coordinate point is compared with a corresponding threshold value in a dither matrix and binarized into 1 (printed or illuminated) or 0 (not printed or not illuminated) based on the result of the comparison. This method enables obtaining binarized data for area coverage modulation by just comparing the density values of pixels in image data with threshold values in a dither matrix and therefore enables high-speed processing.

Also, there are dither methods that use three or more values. For example, when forming an image with an inkjet recording apparatus that can form dots in three sizes, three dither matrices are prepared and pixels are classified into four halftone levels: 0 (no dot), 1 (small-size dot), 2 (medium-size dot), and 3 (large-size dot).

There are many types of dither matrices. For example, Bayer dither matrix, random dither matrix, and blue-noise dither matrix are well-known.

With these dither matrices, during area coverage modulation, dots are not concentrated in a particular area but uniformly distributed. Therefore, these dither matrices are classified as dispersion types.

On the other hand, there are dither matrices that are so designed that dots are concentrated around a certain point. These dither matrices are classified as concentration types.

For example, there is a concentration-type dither matrix in which submatrices are arranged so as to form a screen angle (see, for example, patent documents 1 and 2). Patterns formed by concentrated dots are highly visible when printed and therefore hide unevenness in image density caused by, for example, low paper quality or low printing accuracy. Therefore, concentration-type dither matrices are widely used especially in commercial printing.

Patent document 3 discloses a method of producing a mask or a dither matrix made of threshold values with which pixels in multivalued image data are compared to convert the multivalued image data into a halftone image.

This method includes steps of a) determining a halftone dot pattern for each of predetermined halftone levels and b) creating a mask with the halftone dot patterns obtained in step a). In step a), halftone dot patterns are determined independently for each halftone level.

Patent document 4 discloses a method of preparing a halftone processing mask used in a tone reproduction method in which, when converting a multi-tone image dot by dot into binarized or multivalued image data using a dither matrix, parts of the multi-tone image with a certain density are converted so as to form a line-based pattern having a predetermined direction and other parts are converted so as to obtain high-pass filter characteristics. The halftone processing mask used in the disclosed method is so designed that the line-based pattern includes dots that always synchronize with a recording sequence matrix of dots formed by a combination of multipassing and interlacing of a serial head.

As described above, commercial printing papers are suitable for high-volume printing. However, since commercial printing papers have lower permeability than inkjet printing papers, even a high penetration pigmented ink with better fixation characteristics may not be quickly fixed on a commercial printing paper. Therefore, beading easily occurs on a commercial printing paper. Also, since inks do not spread smoothly on a commercial printing paper, some pixels may be left unfilled.

Patent document 5 discloses a water-based ink including a polyalkylene oxide derivative. The disclosed water-based ink is user for inkjet recording and has excellent drying characteristics and water resistance. However, the disclosed water-based ink has a high surface tension and is therefore not suitable for printing on a commercial printing paper.

Although concentration-type dither matrices have advantages as described above, they have disadvantages too.

For example, when forming an image using an inkjet recording apparatus, concentration of dots or concentration of ink in an area may cause bleeding or undermine fixation of the ink. It is possible to design a concentration-type dither matrix so that dots are not concentrated excessively. However, in highlight parts of an image, since only a small amount of ink is used, it is preferable to concentrate dots. On the other hand, in shadow parts, when dots are concentrated on a paper on which ink does not spread smoothly, some pixels may be left unfilled and the image quality may be reduced. These two conflicting facts are making it difficult to design an appropriate dither matrix.

To reproduce smooth gradation using a dither matrix, the number of gradation levels of the dither matrix must be larger than that of input pixels.

Generally, there are two methods to increase the number of gradation levels. A first method is to increase the size of a submatrix. A second method is to use multiple submatrices as a unit and thereby to increase the total number of dots (see, for example, patent document 1).

In the first method, when the number of gradation levels increases, the screen frequency decreases. Therefore, the first method is not suitable to produce a high-resolution image with a large number of gradation levels.

The second method makes it possible to increase the number of gradation levels without decreasing the screen frequency. However, since the dot areas (the numbers of dots generated) of submatrices are not always the same, if the ratio between submatrices with a large number of dots and submatrices with a small number of dots is unbalanced, the resulting pattern may look like a texture. Therefore, in the second method, the order of selecting submatrices in dot arrangement is important.

When processing a color image including multiple color planes, such as CMYK or RGB, if all of the color planes are processed using the same dither matrix, secondary or higher colors are formed by overlapping halftone patterns of different colors. When an image is formed in this manner on a paper on which ink does not spread smoothly, irregular white spots may be left in the image and, as a results the image quality is reduced. Also, with a certain printing apparatus where a dominant color is determined by the order of overlapping inks, color distortion may also occur.

Patent document 6 discloses a method of preparing a halftone processing mask and an inkjet recording apparatus using the halftone processing mask. The disclosed halftone processing mask is designed to form line-based patterns in such a manner that the recording sequence can be most effectively performed and makes it possible to form a high-quality image even with a low-resolution inkjet recording apparatus.

[Patent document 1] Japanese Patent Application Publication No. 10-75375
[Patent document 2] Japanese Patent Application Publication No. 2003-259118
[Patent document 3] Japanese Patent Application Publication No. 2003-46777
[Patent document 4] Japanese Patent Application Publication No. 2005-1221
[Patent document 5] Japanese Patent Application Publication No. 2001-139849
[Patent document 6] Japanese Patent Application Publication No. 2005-1221

BRIEF SUMMARY DISCLOSURE OF THE INVENTION

In various embodiments of an aspect of this disclosure, there are provided an inkjet recording apparatus, a pigmented ink used by the inkjet recording apparatus, an image processing method, a storage medium containing an image processing program for causing a computer to perform the image processing method, and recorded matter, respectively, that make it possible to improve ink fixation and to reduce bleeding and beading caused by ink drops clumping together and thereby make it possible to form a high-resolution, high-quality image on a coated paper for commercial printing (commercial printing paper).

According to another aspect, an inkjet recording apparatus for performing recording by jetting a recording liquid onto a recording medium includes an image processing unit configured to obtain an output halftone level by performing halftone processing on input image data, to select a dot arrangement order according to the obtained output halftone level, and thereby to generate dot data where dots are arranged in a grid-like pattern; wherein the inkjet recording apparatus is configured to use a pigmented ink as the recording liquid when the recording medium is a commercial printing paper, and to record the dots in a staggered arrangement where positions of the dots in odd/even-numbered columns or odd/even-numbered rows in the dot data are shifted in a sub-scanning direction or in a main-scanning direction.

BRIEF DESCRIPTION OF THE DRAWINGS

FIG. 13 is a drawing illustrating exemplary dither matrices used in an image processing method according to an embodiment of the present invention;

FIG. 14 is a drawing illustrating a dither matrix for small dots shown in FIG. 13;

FIG. 15 is a drawing used to describe the difference in dot arrangement orders of a concentration-type submatrix and a dispersion-type submatrix according to an embodiment of the present invention;

FIG. 20 is a drawing illustrating an exemplary base dither matrix and a dither matrix having an opposite dot arrangement order to that of the exemplary base dither matrix;

FIG. 23 is a drawing illustrating exemplary dot data generated by halftone processing according to an embodiment of the present invention;

BEST MODE FOR CARRYING OUT THE INVENTION

Figure 1:
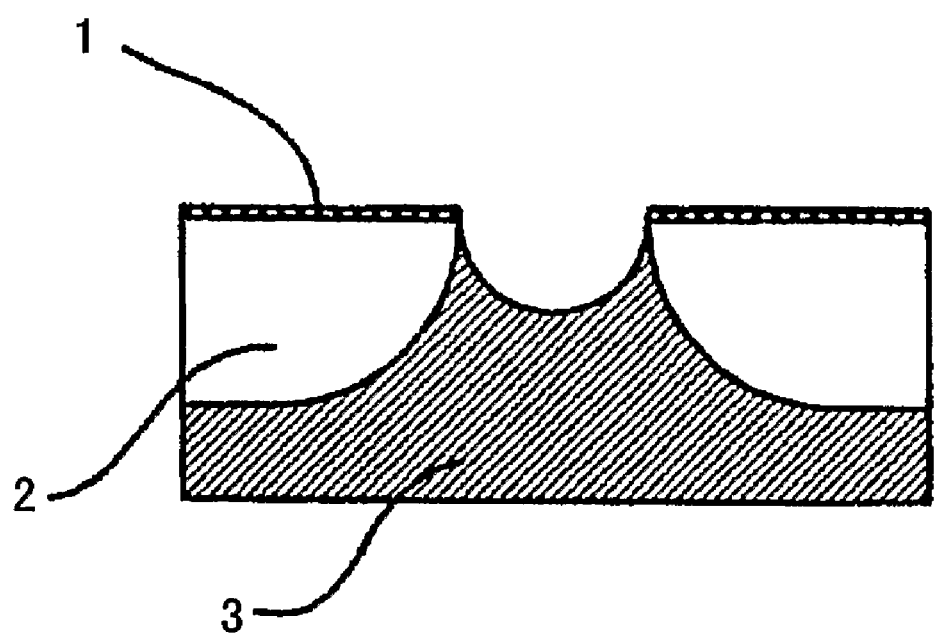
FIG. 1 is a cut-away side view of an exemplary nozzle plate of an exemplary inkjet head.

Preferred embodiments of the present invention are described below with reference to the accompanying drawings.

An inkjet recording apparatus and an image processing method using an inkjet recording apparatus are described below.

An exemplary inkjet recording apparatus according to an embodiment of the present invention records an image by jetting a recording liquid and thereby forming dots on a recording medium. The exemplary inkjet recording apparatus includes an image processing unit configured to obtain an output halftone level by performing halftone processing on input image data, to select a dot arrangement order according to the obtained output halftone level, and thereby to generate dot data where dots are arranged in a grid-like pattern. The exemplary inkjet recording apparatus uses a pigmented ink (may also be called just "ink" in descriptions below), especially, a water-based high-penetration pigmented ink as a recording liquid when forming an image on a commercial printing paper. Also, the exemplary inkjet recording apparatus is configured to record the dots in a staggered arrangement where positions of the dots in odd/even-numbered columns or odd/even-numbered rows in the dot data are shifted in the sub-scanning direction or in the main-scanning direction.

In an exemplary image processing method of processing input image data for recording by the exemplary inkjet recording apparatus according to an embodiment of the present invention, a dot arrangement order is selected according to an output halftone level obtained by performing halftone processing on the input image data. A dither matrix used in the halftone processing is designed to convert input image data having M input halftone levels into output image data having N (M>N>2) output halftone levels.

In the dither matrix, multiple submatrices are arranged at a screen angle with no space between them and without overlap so that output pixels form a halftone dot pattern or screen lines. For an output halftone level that is lower than a threshold level T (N>T>1), submatrices with a concentration-type dot arrangement order are used so that dots are formed close to each other. For an output halftone level that is equal to or higher than the threshold level T, submatrices with a dispersion-type dot arrangement order are used so that dots are formed dispersively (so that dots are distributed evenly).

According to an embodiment of the present invention, a water-based high-penetration pigmented ink whose penetration capability is improved by adding a fluorinated surfactant is used to improve ink fixation on a commercial printing paper. Also, according to an embodiment of the present invention, dots in dot data are recorded in a staggered arrangement where positions of the dots in odd/even-numbered columns or odd/even-numbered rows in the dot data are shifted in the sub-scanning direction or in the main-scanning direction to prevent pixels from being left unfilled and to reduce bleeding and beading caused by overlapping dots. The resolution of the dot data is preferably 400 dpi or higher to form a high-quality image on a commercial printing paper and to prevent degradation of the formed image.

As described above, a dither matrix used in halftone processing in the exemplary image processing method is designed to convert input image data having M input halftone levels into output image data having N (M>N>2) output halftone levels. When an output halftone level at which concentration of dots causes problems such as bleeding is T (N>T>1), the dot arrangement order in each of the submatrices of the dither matrix is preferably a concentration type when the output halftone level is less than T and is preferably a dispersion type when the output halftone level is T or higher. Such a dither matrix makes it possible to process an image using the advantages of both concentration-type and dispersion-type dot arrangements.

Also, a dither matrix is preferably designed so that concentration-type submatrices are filled with the highest output halftone level (T−1) of the concentration-type submatrices before they are switched to dispersion-type submatrices.

In other words, on the assumption that concentration of dots causes no problem at the highest output halftone level (T−1) of the concentration-type submatrices, a dither matrix is preferably designed so that the concentration-type submatrices are filled with the output halftone level (T−1) before the output halftone level T is generated. Such a dither matrix makes it possible to increase ink coverage on paper and thereby to prevent occurrences of irregular white spots in an image formed on a paper on which ink does not spread smoothly.

Also, depending on the sizes of ink drops corresponding to output halftone levels, a dither matrix may be designed so that the concentration-type submatrices are filled with dots at each or some of the output halftone levels (T−1, T−2, T−3, . . . 1).

Thus, according to an embodiment of the present invention, a dither matrix is preferably designed so that, at a switching point from a lower one of the N (M>N>2) output halftone levels to a higher one of the N (M>N>2) output halftone levels, the submatrices are filled with the first one of the N (M>N>2) output halftone levels. Also, submatrices in a dither matrix are preferably selected in such an order that dots are dispersed in the dither matrix. In other words, submatrices are preferably selected alternately in such an order that adjoining submatrices are not selected successively or in such an order that arranged dots obtain high-pass filter characteristics.

Also, in determining the arrangement of dots, submatrices are preferably selected in such a manner that the maximum difference between the numbers of dots in a submatrix having many dots and a submatrix having fewer dots becomes 1 or smaller. Also, to avoid placing dots successively in adjoining submatrices in a dither matrix, submatrices are preferably selected at certain intervals in a certain direction or preferably selected in such an order that the dither matrix obtains high-pass filter characteristics. Such a dither matrix makes it possible to evenly form dots in an image and to prevent formation of a pattern that looks like a texture.

When an input image is a color image having multiple color planes, a dither matrix created by converting a base dither matrix by one or more conversion methods including rotation, axisymmetric inversion, and translation is preferably used for at least one of the color planes.

In other words, when processing a color image composed of multiple color planes, such as CMYK or RGB, it is preferable to use for the color planes dither matrices created by converting a base dither matrix by one or more conversion methods including rotation, axisymmetric inversion, and translation. This method makes it possible to evenly overlap color dots of secondary or higher colors and thereby makes it possible to prevent occurrences of irregular white spots and color distortion.

Also, it is preferable to use a base dither matrix for one color plane and a reversed dither matrix, which is created by reversing the dot arrangement order of the base dither matrix for each output halftone level, for another color plane. With this method, dots of the two color planes do not overlap until the percentage of dots at each output halftone level reaches 50%. Thus, this method makes it possible to increase the dispersion of color dots and thereby to prevent occurrences of irregular white spots and color distortion.

Also, it is preferable that each of submatrices in a dither matrix have a shape made by combining a large rectangle and a small rectangle in such a manner that a corner of the large rectangle and a corner of the small rectangle are in contact with each other and a side of the large rectangle and a side of the small rectangle are in contact with each other; and, when processing a color image having CMYK color planes, a translated dither matrix, which is created by translating a base dither matrix one or more lines in a vertical direction, be used for some of the CMYK color planes.

Using submatrices each shaped like a combination of two rectangles of different sizes as described above makes it possible to fill a dither matrix without leaving a space and without overlap. Also, the screen angle and screen frequency of a dither matrix can be changed by changing the sizes of the rectangles. Further, using vertically shifted dither matrices for color planes makes it possible to produce a color image with less moiré and less color distortion.

When processing a color image having multiple color planes, it is preferable to use a linear dither matrix having a certain screen angle in combination with the dither matrix described above. Also, when processing a color image having multiple color planes, it is preferable to use a Bayer dither matrix in combination with the dither matrix described above.

Further, it is preferable to use a linear dither matrix having a certain screen angle or a Bayer dither matrix in combination with a dither matrix created by converting a base dither matrix by rotation, axisymmetric inversion, or translation, or in combination with a dither matrix created by reversing the dot arrangement order of the base dither matrix for each halftone level. This method makes it possible to form dots in such a manner that a dot of a color is evenly overlapped with dots of other colors and thereby makes it possible to reduce color distortion in color image processing.

Halftone processing in the exemplary image processing method is preferably an error diffusion method using an error diffusion algorithm that converts input image data having M input halftone levels into output image data having N ($M > N \geq 2$) output halftone levels.

Also, it is preferable to use a high-penetration pigmented ink and an image forming method of recording dots in a staggered arrangement where positions of the dots in odd/even-numbered columns or odd/even-numbered rows in the dot data are shifted in the sub-scanning direction or in the main-scanning direction, in combination with an image processing method using an error diffusion method where a dot arrangement is selected according to an output halftone level. This combination makes it possible to prevent problems (such as bleeding and beading) caused by uneven overlaps of dots and thereby to form a high-quality image on a commercial printing paper.

Details of halftone processing in the exemplary image processing method according to an embodiment of the present invention are described later.

An exemplary inkjet recording apparatus according to an embodiment of the present invention is configured to form an image by jetting ink onto a recording medium using an inkjet (liquid jetting) head. An ink-repellent film (water repellent layer) is preferably formed on a surface (ink jetting surface or liquid jetting surface) of an inkjet head in which surface a nozzle hole is formed.

<Ink-Repellent Film>
(Surface Roughness)

Surface roughness Ra of an ink-repellent film is preferably 0.2 μm or lower. Keeping the surface roughness Ra equal to or lower than 0.2 μm reduces the amount of ink that remains on a nozzle surface after wiping.

Figure 2A:
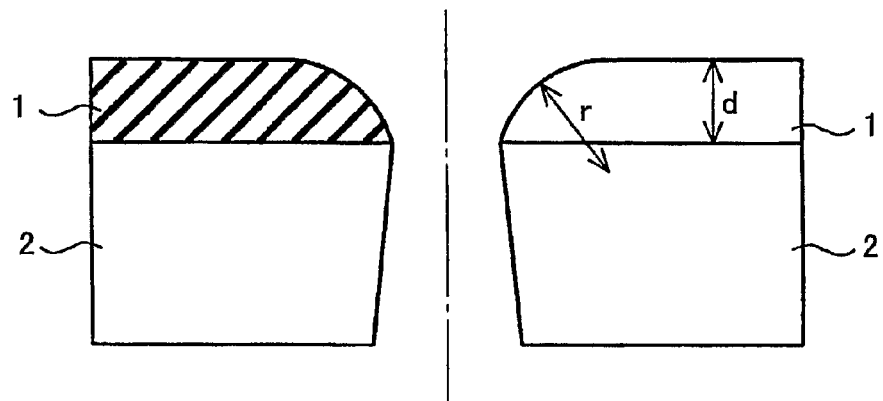
FIGS. 2A through 2C are magnified cut-away side views of the exemplary nozzle plate.
Figure 2B:
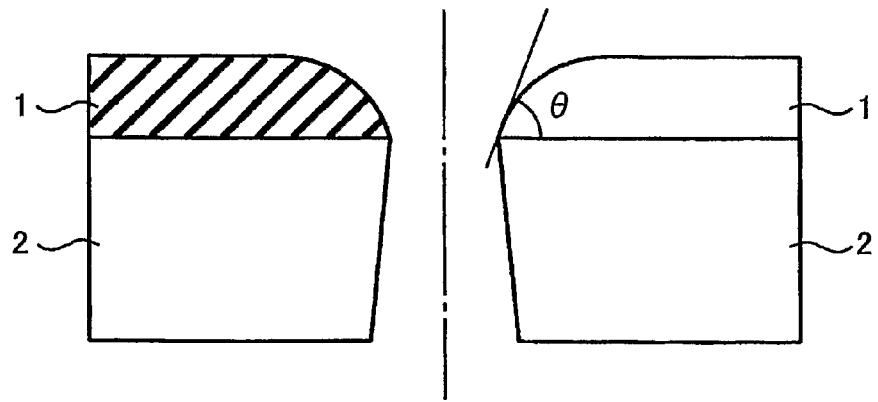
Figure 2C:
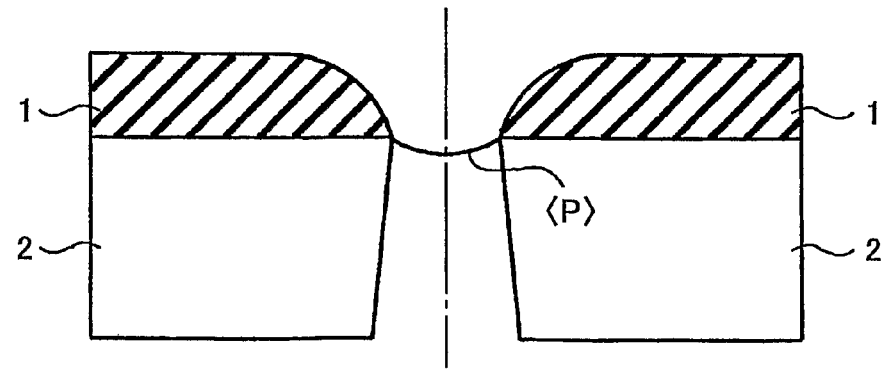
Figure 3A:
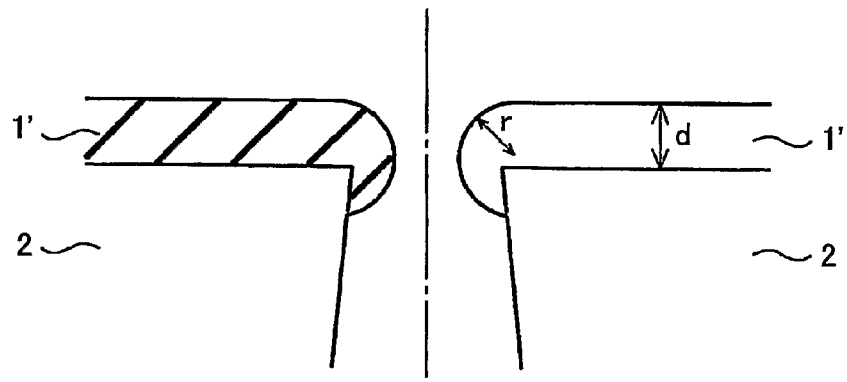
FIGS. 3A through 3C are drawings illustrating a comparative example of an ink-repellent film.
Figure 3B:
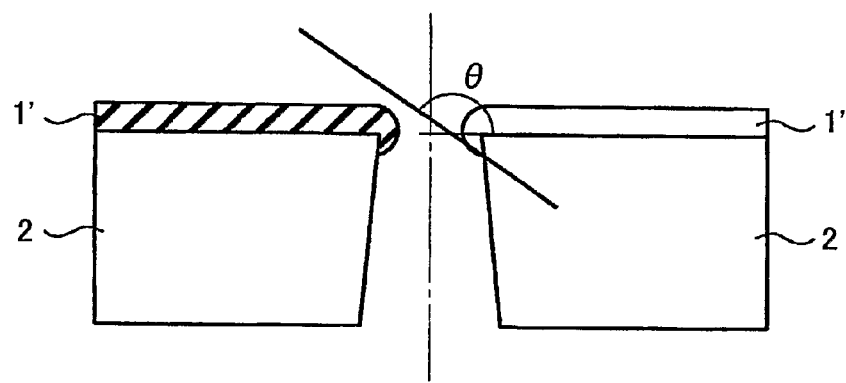
Figure 3C:
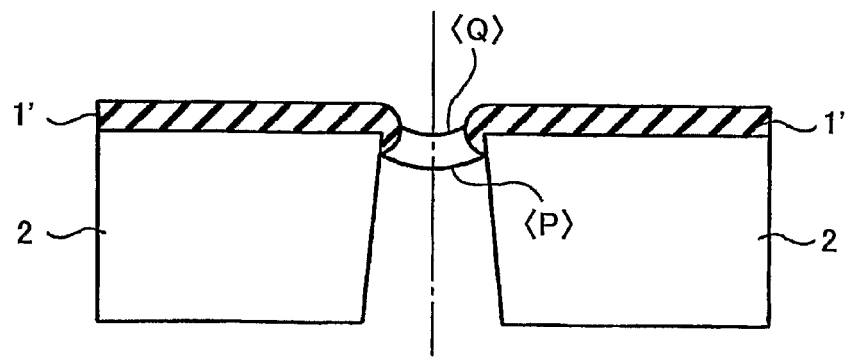
Figure 4:
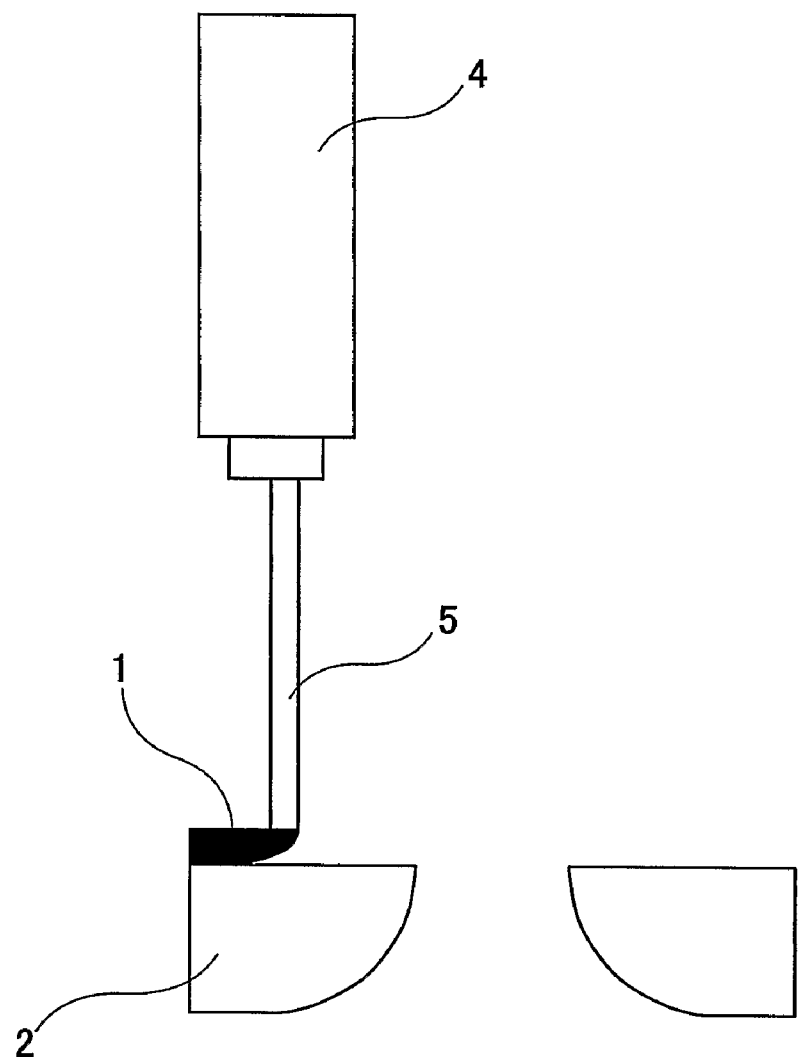
FIG. 4 is a drawing illustrating an exemplary process of forming an ink-repellent film.
Figure 5A:
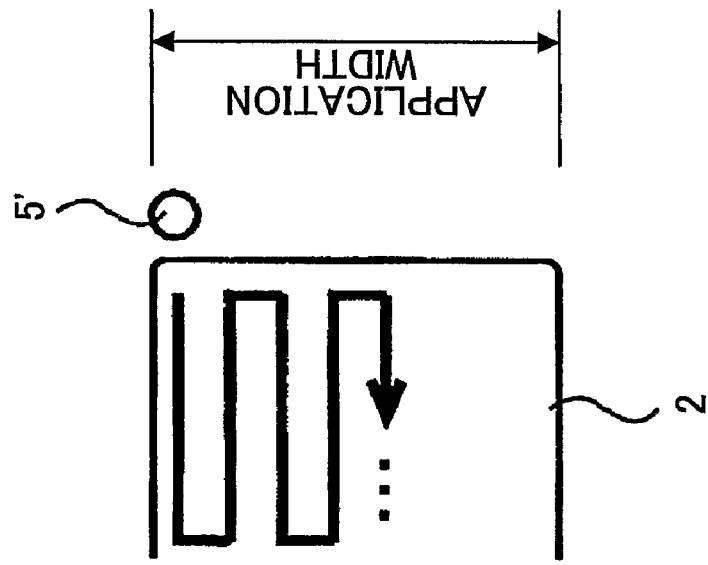
FIGS. 5A and 5B are drawings used to describe an exemplary structure of a dispensing opening of a needle of a dispenser for forming an ink-repellent film.
Figure 5B:
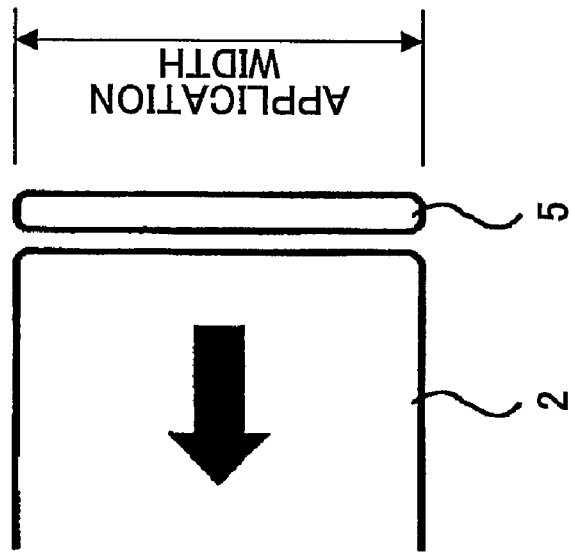
Figure 6:
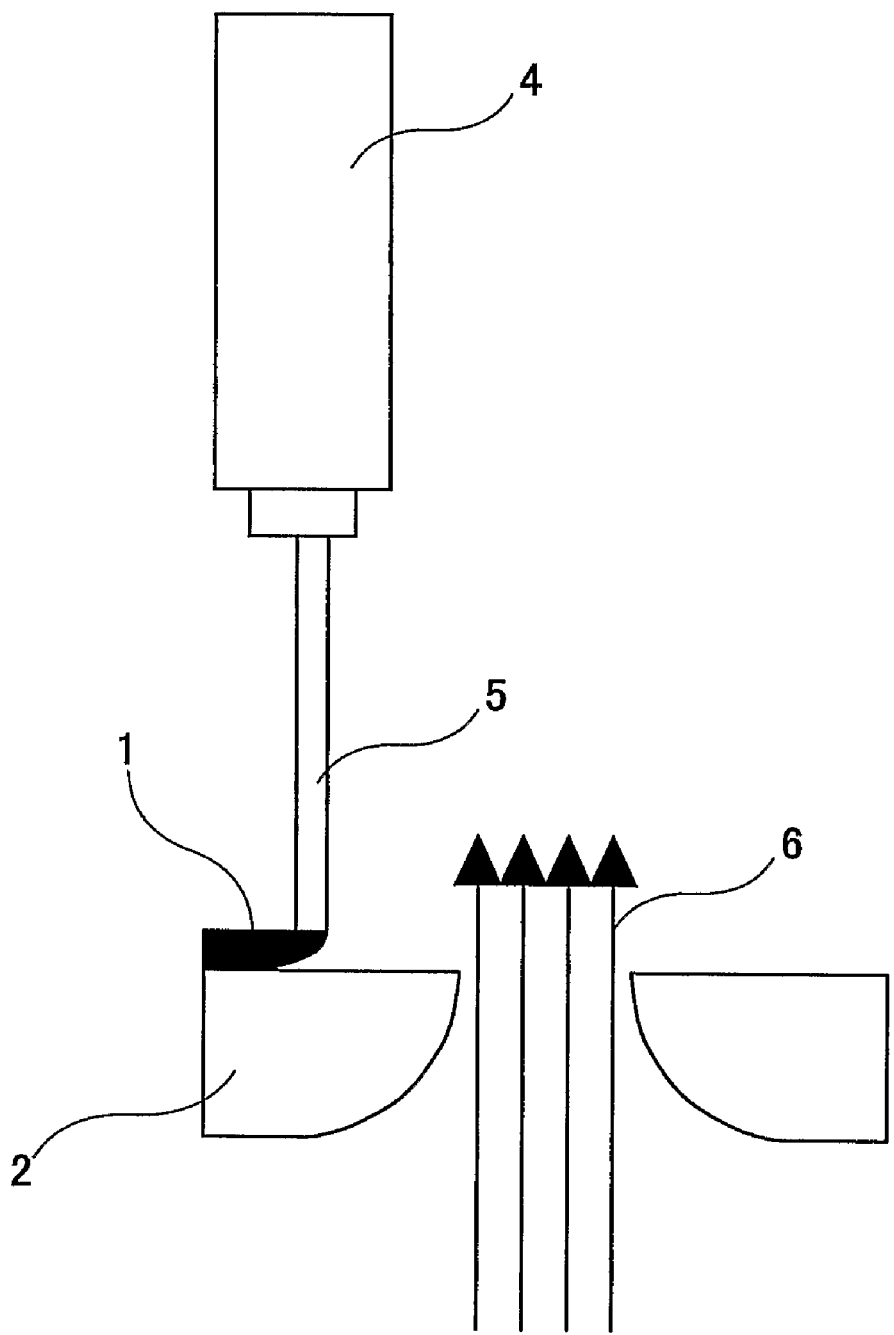
FIG. 6 is a drawing illustrating another exemplary process of forming an ink-repellent film.
Figure 7:
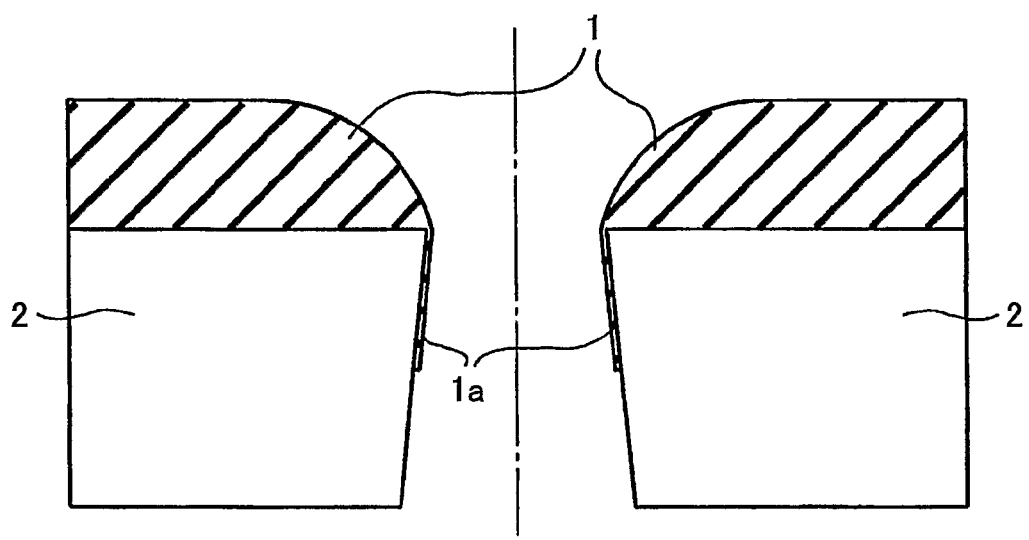
FIG. 7 is a drawing used to describe still another exemplary process of forming an ink-repellent film.
Figure 8:
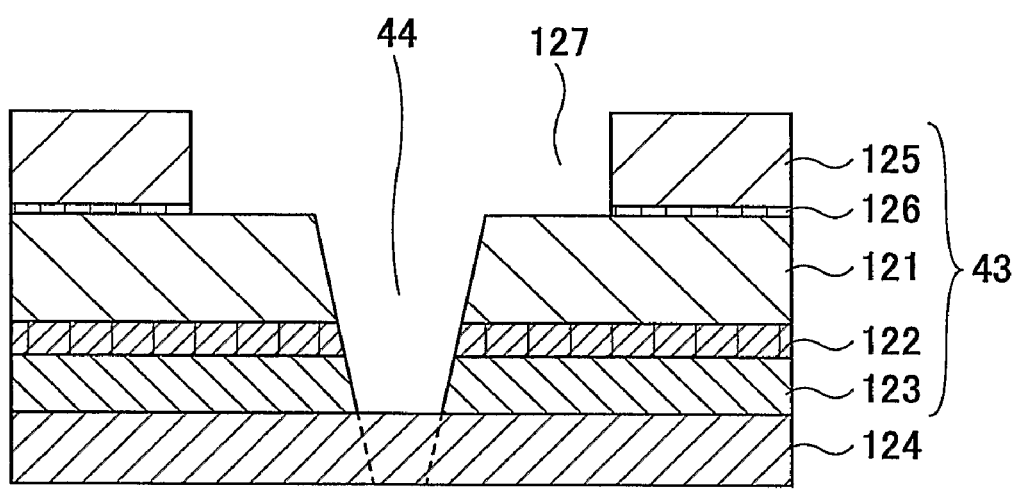
FIG. 8 is a cut-away side view of an exemplary inkjet head according to an embodiment of the present invention.
Figure 9:
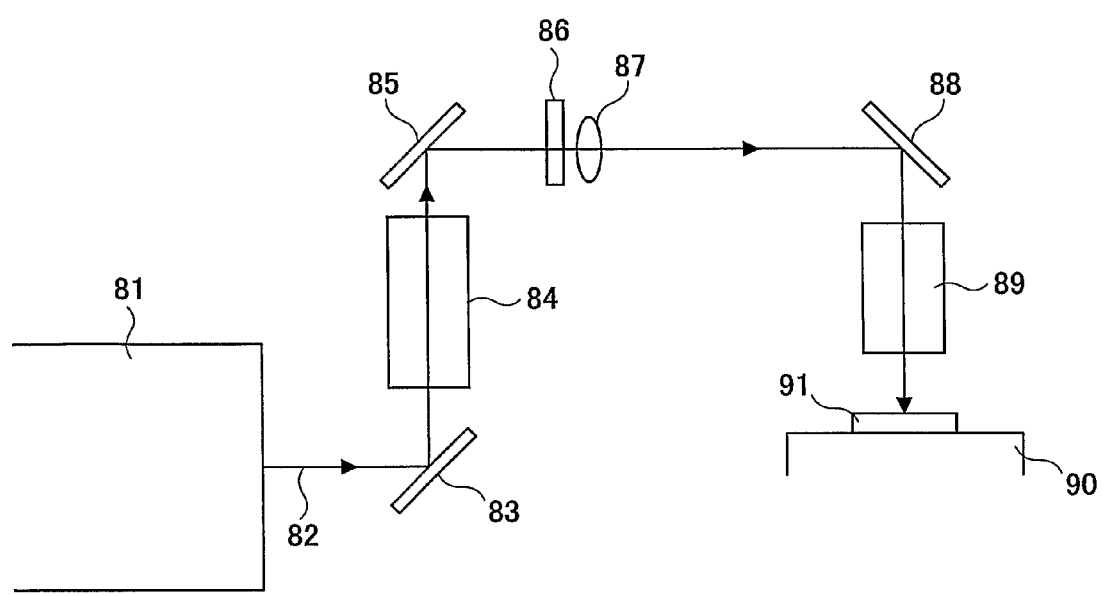
FIG. 9 is a drawing illustrating an exemplary configuration of an excimer laser processing apparatus used to form a nozzle hole.
Figure 10A:
FIGS. 10A through 10F are drawings illustrating an exemplary process of producing a nozzle plate as a part of an exemplary method of producing an inkjet head according to an embodiment of the present invention.
Figure 10B:
Figure 10C:
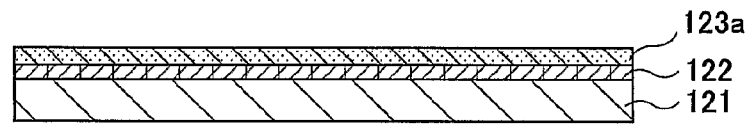
Figure 10D:
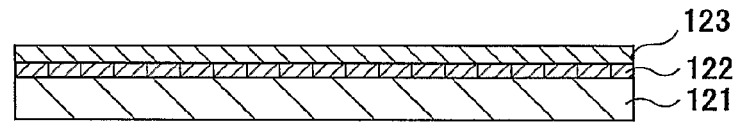
Figure 10E:
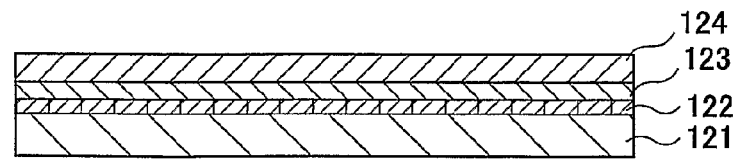
Figure 10F:
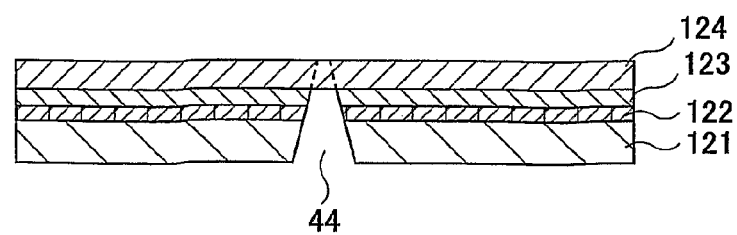
Figure 11:
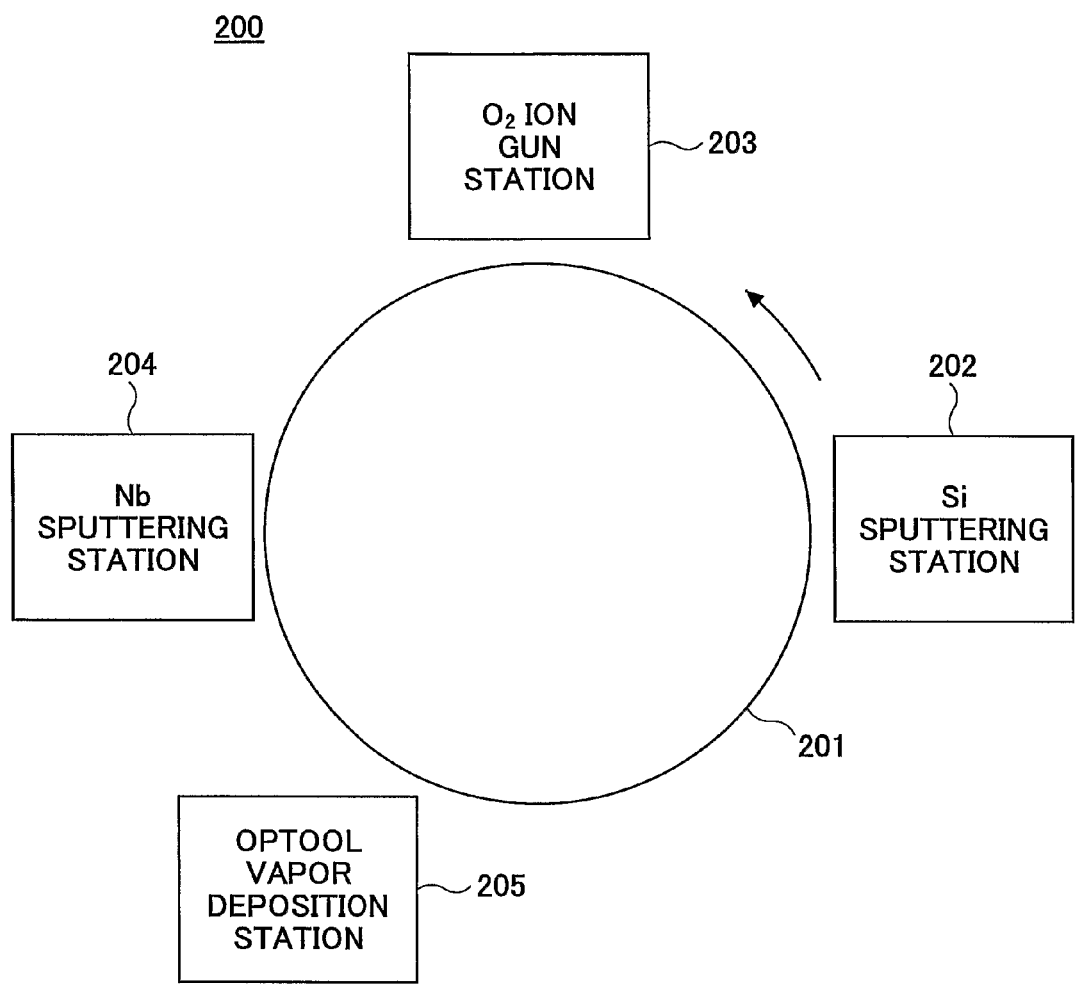
FIG. 11 is a drawing illustrating an exemplary configuration of an apparatus used to produce an inkjet head.

FIGS. 1 through 2C are cut-away side views of an exemplary nozzle plate of an exemplary inkjet (liquid jetting) head according to an embodiment of the present invention. In this embodiment, a nozzle plate 2, which is a base material of the exemplary inkjet head, is formed by electroforming nickel. An ink-repellent film 1 made of a silicone resin film with a thickness of 0.1 μm or larger is formed on a surface of the nozzle plate 2. The surface roughness Ra of the ink-repellent film 1 is preferably equal to or lower than 0.2 μm.

The thickness of the ink-repellent film 1 is more preferably 0.5 μm or smaller.

When a nozzle hole is filled with ink 3, a meniscus (liquid surface) P is formed at the boundary of the ink-repellent film 1 and the nozzle plate 2 as shown in FIG. 2C.

Commercial printing papers used as recording media according to an embodiment of the present invention are described below. Commercial printing papers include coated papers for offset printing, gravure printing, electrophotographic printing, and commercial ink jet printing.

<Recording Medium>

An exemplary commercial printing paper (hereafter, may also be called an exemplary recording medium) according to an embodiment of the present invention is composed of a base material and at least one coating layer on a surface of the base material. Also, the exemplary recording medium may include additional layers.

<Base Material>

Various materials may be used as the base material of the exemplary recording medium depending on the purpose. For example, a sheet of paper mainly made of wood fibers and a nonwoven fabric mainly made of wood and synthetic fibers may be used.

A sheet of paper may be made of wood pulp or recycled pulp. Examples of wood pulp include leaf bleached kraft pulp (LBKP), needle bleached kraft pulp (NBKP), NBSP, LBSP, GP, and TMP.

As materials of recycled pulp, recycled papers included in the list of standard qualities of recycled papers published by the Paper Recycling Promotion Center may be used.

For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, wrapping paper, fancy paper, medium quality paper, newspaper, woody paper, supermarket flyers, simili paper, pure-white roll paper, and milk cartons.

The above materials may be used individually or in combination.

Normally, recycled pulp is produced by the following four steps:

(1) A defibrating step of breaking down used paper into fibers and separating ink from the fibers by using a mechanical force and a chemical in a pulper.

(2) A dust removing step of removing foreign substances (such as plastic) and dust in the used paper by using, for example, a screen and a cleaner.

(3) A deinking step of expelling the ink separated by a surfactant from the fibers by using a flotation method or a cleaning method.

(4) A bleaching step of bleaching the fibers by oxidization or reduction. When mixing recycled pulp and wood pulp, the percentage of recycled pulp is preferably 40% or lower to prevent produced paper from curling after recording.

As an internal filler for the base material, a conventional white pigment may be used.

For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin.

The above substances may be used individually or in combination.

As an internal sizing agent used when producing the base material, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of a recording paper (medium), a recording paper made using alkyl ketene dimer may cause a slip when being conveyed in an inkjet recording apparatus.

<Coating Layer>

A coating layer of the exemplary recording medium contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment.

Especially, kaolin provides a high gloss surface similar to that of an offset paper and is therefore preferable.

When an ink in which a colorant is dispersed is used, since the colorant stays on the surface of the coating layer, it is not necessary to mix a large amount of inorganic pigment having a low refractive index such as amorphous silica or alumina in the coating layer.

Examples of kaolin include delaminated kaolin, calcined kaolin, and engineered kaolin made by surface modification. To provide a high gloss surface, the mass percentage of a type of kaolin, which has a particle size distribution where 80 or more mass percent of particles have a diameter of 2 μm or smaller, is preferably 50 percent or more in the total amount of kaolin.

The mass ratio of the binder to kaolin in the coating layer is preferably 100:50. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability.

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent.

An organic pigment as described above has a specific gravity lower than that of an inorganic pigment and therefore provides a thick, high-gloss coating layer having good coatability.

If the mass percentage of an organic pigment is less than 2 percent, a desired effect may not be obtained. If the mass percentage of an organic pigment is more than 20 percent, the fluidity of a coating liquid may become too low and, as a result, the efficiency of a coating process may decrease and the operational costs may increase.

Organic pigments can be divided into several types according to their particle shapes: solid-shape, hollow-shape, and doughnut-shape. To achieve a good balance between the glossiness, coatability, and fluidity of a coating liquid, it is preferable to use an organic pigment having hollow-shaped particles with a void percentage of 40 percent or higher and an average diameter of between 0.2-3.0 μm.

As a binder, a water-based resin is preferably used.

As a water-based resin, a water-soluble resin or a water-dispersible resin may be used.

Any type of water-based resin may be used depending on the purpose.

For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda.

The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorbency.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer.

A water-dispersible resin may contain a cross-linking agent such as methylol melamine, methylol urea, methylol hydroxypropylene urea, or isocyanate. Also, a self-crosslinking copolymer containing a unit of N-methylolacrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorbency of a recording medium falls within a specific range.

When a water-dispersible colorant is used, whether to mix a cationic organic compound in the binder is optional.

For example, primary to tertiary amines that react with sulfonic groups, carboxyl groups, or amino groups of a direct dye or an acid dye in a water-soluble ink and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly(trimethyl aminoethyl-methacrylate methylsulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt condensate, dimethyl diallyl ammonium chloride, poly diallyl methyl amine hydrochloride, poly(diallyl dimethyl ammonium chloride), poly(diallyl dimethyl ammonium chloride-sulfur dioxide), poly(diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamide polymer, and modified polyethylenimine alkylene oxide.

The above substances may be used individually or in combination.

It is especially preferable to use a cationic organic compound having a low-molecular weight such as dimethylamine-epichlorohydrin polycondensate or polyallylamine hydrochloride in combination with a cationic organic compound having a relatively-high molecular weight such as poly(diallyl dimethyl ammonium chloride). Compared with a case where only one cationic organic compound is used, using cationic organic compounds in combination improves image density and reduces feathering.

The equivalent weight of cation in a cationic organic compound obtained by the colloid titration method (using polyvinyl potassium sulfate and toluidine blue) is preferably between 3 and 8 meq/g.

With an equivalent weight in the above range, the dry deposit mass of the cationic organic compound falls within a preferable range. In the measurement of the equivalent weight of cation using the colloid titration method, a cationic organic compound is diluted with distilled water so that the solid content in the solution becomes 0.1 mass percent. No pH control is performed.

The dry deposit mass of a cationic organic compound is preferably between 0.3 and 2.0 $g/m^2$.

If the dry deposit mass of a cationic organic compound is lower than 0.3 $g/m^2$, sufficient improvement in image density and sufficient reduction in feathering may not be achieved.

Any type of surfactant may be used depending on the purpose.

For example, an anionic surfactant, a cationic surfactant, an amphoteric surfactant, or a nonionic surfactant may be used. Among the above surfactants, a nonionic surfactant is especially preferable. Adding a surfactant improves water resistance and density of an image and therefore reduces bleeding.

Examples of nonionic surfactants include higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide.

The above substances may be used individually or in combination.

Polyhydric alcohol is not limited to a specific type and any type of polyhydric alcohol may be used depending on the purpose.

For example, glycerol, trimethylolpropane, pentaerythrite, sorbitol, or surcose may be used.

Ethylene oxide adduct may be produced by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer as needed.

Examples of other components include additives such as an alumina powder, a pH adjuster, an antiseptic agent, and an antioxidant.

An exemplary method of forming the coating layer is described below.

The method of forming the coating layer is not limited to a specific method. For example, the coating layer may be formed by impregnating the base material with a coating liquid or by applying a coating liquid to the base material.

For the impregnation with or application of a coating liquid, a coater such as a conventional size press, a gate roll size press, a film transfer size press, a blade coater, a rod coater, an air knife coater, or a curtain coater may be used. Also, using a conventional size press, a gate roll size press, or a film transfer size press attached to a paper machine for the impregnation with or application of a coating liquid may improve the efficiency of the coating process.

There is no specific limit to the amount of coating liquid on the base material. However, the solid content of a coating liquid on the base material is preferably between 0.5 and 20 g/m², and more preferably between 1 and 15 g/m². After the impregnation with or application of a coating liquid, the coating liquid may be dried. The temperature for this drying process is preferably between 100 and 250° C., but is not limited to the specific range.

The exemplary recording medium may also have a back layer on the back of the base material, and other layers between the base material and the coating layer or between the base material and the back layer. Also, a protective layer may be provided on the coating layer. Each of the layers may be composed of one layer or multiple layers.

In embodiments of the present invention, a recording medium having a configuration as described above is called a commercial printing paper.

Normally, solvent ink is used to print on a commercial printing paper. However, when used for a different type of paper, solvent ink, because of its high penetration capability, may penetrate through the paper and appear on the back of the paper or may cause bleeding over time.

Unlike in a commercial printing system, using solvent ink with an inkjet recording system for office and home users may cause problems.

Table 3 below shows the results of evaluating the characteristics of three commercial printing papers when used with water-based ink. In this evaluation, the amounts of pure water transferred onto the three commercial printing papers were measured by using a dynamic scanning absorptometer.

TABLE 3

|  | Amount of pure water transferred (ml/m²) | |
| --- | --- | --- |
|  | Contact time: 100 ms | Contact time: 400 ms |
| Coated paper for offset printing (brand name: Aurora Coat, grammage = 104.7 g/m², Nippon Paper Industries Co., Ltd.) | 2.8 | 3.4 |
| Coated paper for electrophotographic printing (brand name: POD Gloss Coat, grammage = 100 g/m², Oji paper Co., Ltd.) | 3.1 | 3.5 |
| Matt coated paper for ink jet printing (brand name: Superfine, Seiko Epson Corporation) | 41.0 | 44.8 |

In an environmental condition of 23° C. and 50% RH, the amounts of pure water transferred onto the three commercial printing papers measured by a dynamic scanning absorptometer after a contact time of 100 ms ranged between 2 and 35 ml/m². To obtain a practical print quality, the amount of pure water transferred is preferably between 4 and 26 ml/m². When the amount of transferred pure water after a contact time of 100 ms is smaller than the preferable range, beading may occur. When the amount is larger than the preferable range, the diameter of a recorded ink dot may become smaller than a preferable diameter.

The amounts of pure water transferred onto the three commercial printing papers measured by a dynamic scanning absorptometer after a contact time of 400 ms ranged between 3 and 40 ml/m². To obtain a practical print quality, the amount of pure water transferred is preferably between 5 and 29 ml/m². When the amount of transferred pure water after a contact time of 400 ms is smaller than the preferable range, drying becomes insufficient and spur marks may appear. When the amount is larger than the preferable range, the glossiness of an image after dried may be reduced.

As described above, to form a high-quality images the amount of pure water transferred onto a commercial printing paper is preferably between 4 and 26 ml/m² after a contact time of 100 ms and between 5 and 29 ml/m² after a contact time of 400 ms.

A dynamic scanning absorptometer (DSA; JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The dynamic scanning absorptometer scans a disk-shaped test sample by moving an liquid-absorbing head spirally over the test sample and thereby measures the amount of liquid absorbed at as many points as necessary. The scanning speed is automatically changed according to a predetermined pattern.

A liquid supplying head that supplies liquid to the test sample is connected via a Teflon (registered trademark) tube to the capillary. The position of a meniscus in the capillary is automatically detected by an optical sensor. To measure the amounts of transferred pure water described above, a dynamic scanning absorptometer (K350 series, type D, Kyowa Co., Ltd.) was used. The amount of transferred pure water after a contact time of 100 ms or 400 ms can be obtained by interpolating the transferred amounts measured at time points near the contact time.

<Ink>

Exemplary pigmented inks, especially, high penetration pigmented inks according to embodiments of the present invention are described below.

Examples of organic pigments include azo series, phthalocyanine series, anthraquinone series, quinacridone series, dioxazine series, indigo series, thioindigo series, perylene series, isoindolinone series, aniline black, azomethine series, rhodamine B lake pigment, and carbon black. Examples of inorganic pigments include iron oxide, titanium oxide, calcium carbonate, barium sulfate, aluminum hydroxide, barium yellow, iron blue, cadmium red, chrome yellow, and metallic flake.

The diameter of pigment particles is preferably between 0.01 and 0.30 μm. When the diameter is smaller than 0.01 μm, in other words, the size of pigment particles is close to that of dye particles, light resistance of the pigment may be reduced and feathering may occur. When the diameter of pigment particles is larger than 0.30 μm, the pigment particles may clog inkjet nozzles and filters in a printer and reduce its ink jetting performance.

A pigment of any color, for example, a black pigment or a color pigment, may be used depending on the purpose. Pigments may be used individually or in combination.

Preferably, a carbon black pigment for a black pigmented ink is made by a furnace method or a channel method, and has a primary diameter of 15-40 nm, a BET specific surface area of 50-300 m²/g, a DSP oil absorption of 40-150 ml/100 g, a volatile matter content of 0.5-10%, and a pH value of 2-9.

Examples of carbon black pigments include No. 2300, No. 900, MCF-88, No. 33, No. 40, No. 45, No. 52, MA7, MA8, MA100, No. 2200B (Mitsubishi Chemical Corporation);

Raven 700, Raven 5750, Raven 5250, Raven 5000, Raven 3500, Raven 1255 (Columbian Chemicals Company); Regal 400R, Regal 330R, Regal 660R, MogulL, Monarch 700, Monarch 800, Monarch 880, Monarch 900, Monarch 1000, Monarch 1100, Monarch 1300, Monarch 1400 (Cabot Corporation); Color black FW1, Color black FW2, Color black FW2V, Color black FW18, Color black FW200, Color black S50, Color black S160, Color black S170, Printex 35, Printex U, Printex V, Printex 140U, Printex 140V, Special black 6, Special black 5, Special black 4A, and Special black 4 (Degussa).

Examples of color pigments are listed below.

The following pigments may be used for yellow ink: CI pigment yellow 1, 2, 3, 12, 13, 14, 16, 17, 73, 74, 75, 83, 93, 95, 97, 98, 114, 128, 129, 151, and 154.

The following pigments may be used for magenta ink: CI pigment red 5, 7, 12, 48 (Ca), 48 (Mn), 57 (Ca), 57:1, 112, 123, 168, 184, and 202.

The following pigments may be used for cyan ink: CI pigment blue 1, 2, 3, 15:3, 15:34, 16, and 22; and CI vat blue 4 and 60.

A pigment newly manufactured for the present invention may also be used for each color ink.

Fluorinated surfactants created for the present invention or those available as commercial products may also be used.

Commercially available fluorinated surfactants include Surflon S-111, S-112, S-113, S-121, S-131, S-132, S-141, S-145 (Asahi Glass Co., Ltd.); Fluorad FC-93, FC-95, FC-98, FC-129, FC-135, FC-170C, FC-430, FC-431 (Sumitomo 3M Limited); Megafac F-470, F1405, F-474 (Dainippon Ink and Chemicals, Incorporated); Zonyl TBS, FSP, FSA, FSN-100, FSN, FSO-100, FSO, FS-300, UR (DuPont); FT-110, FT-250, FT-251, FT-400S, FT-150, FT-400SW (NEOS Co. Ltd.); and PF-151N (Omnova Solutions, Inc.). Among them, in terms of reliability and color development, Zonyl FS-300, FSN, FSN-100, and FSO (DuPont) are especially preferable.

As a dispersing agent for dispersing organic pigment powder, a water-soluble resin or a water-soluble surfactant may also be used.

As a water-soluble resin, a block copolymer, a random copolymer, or salt made of two or more monomers selected from the group consisting of styrene, styrene derivative, vinylnaphthalene derivative, aliphatic alcohol ester of $\alpha,\beta$-ethylene unsaturated carboxylic acid, acrylic acid, acrylic acid derivative, maleic acid, maleic acid derivative, itaconic acid, itaconic acid derivative, fumarate, and fumarate derivative may be used. The above water-soluble resins are alkali-soluble resins that are soluble in water solution of a base. A water-soluble resin with a weight-average molecular weight of 3000-20000 is easily dispersible, is able to provide a dispersion with a low viscosity, and is therefore especially preferable for an inkjet recording liquid.

Also, a combination of a polymeric dispersing agent and a self-dispersing pigment is preferable to obtain an appropriate dot diameter. A possible reason why such a combination provides a preferable result is described below.

Mixing a polymeric dispersing agent in an ink reduces the penetration capability of the ink. Also, mixing a polymeric dispersing agent prevents aggregation of a self-dispersing pigment and helps the self-dispersing pigment to spread smoothly in the horizontal direction. A drop of such an ink spreads thin and wide and therefore makes it possible to form a desirable dot.

As a water-soluble surfactant, an anionic surfactant, a cationic surfactant, an amphoteric surfactant, or a nonionic surfactant may be used. Examples of anionic surfactants include higher fatty acid salt, alkyl sulfate, alkyl ether sulfate, alkyl ester sulfate, alkyl arylether sulfate, alkyl sulfonate, sulfosuccinate, alkyl allyl and alkyl naphthalene sulfonate, alkyl phosphate, polyoxyethylene alkyl ether phosphate ester salt, and alkyl allyl ether phosphate. Examples of cationic surfactants include alkyl amine salt, dialkyl amine salt, tetraalkyl ammonium salt, benzalkonium salt, alkyl pyridinium salt, and imidazolinium salt. Examples of amphoteric surfactants include dimethyl alkyl lauryl betaine, alkyl glycine, alkyldi(aminoethyl)glycine, and imidazolinium betaine. Examples of nonionic surfactants include polyoxyethylene alkyl ether, polyoxyethylene alkyl allyl ether, polyoxyethylene polyoxypropylene glycol, glycerin ester, sorbitan ester, sucrose esters, polyoxyethylene ether of glycerin ester, polyoxyethylene ether of sorbitan ester, polyoxyethylene ether of sorbitol ester, fatty acid alkanolamide, polyoxyethylene fatty acid amide, amine oxide, and polyoxyethylene alkylamine.

A pigment may be microencapsulated by coating it with a resin having a hydrophilic radical. Microencapsulating gives the pigment dispersibility. Any of conventional methods may be used to coat a water-insoluble pigment with an organic polymer and thereby to microencapsulate the water-insoluble pigment. Such conventional methods include chemical manufacturing methods, physical manufacturing methods, physicochemical manufacturing methods, and mechanical manufacturing methods.

For example, coating methods (1) through (10) described below may be used.

(1) Interface polymerization method: two types of monomers or two types of reactants are dissolved in a disperse phase and a continuous phase separately, and are caused to react with each other at the interface between the two phases and thereby to form wall membranes.

(2) In-situ polymerization method: aqueous or gaseous monomers and catalysts or two types of reactive substances are supplied from either the continuous phase side or the nuclear particle side, and are caused to react with each other and thereby to form wall membranes.

(3) In-liquid curing coating method: wall membranes are formed by insolubilizing drops of polymer solution containing core material particles in a liquid using a curing agent.

(4) Coacervation (phase separation) method: wall membranes are formed by separating a polymer dispersed liquid, where core material particles are dispersed, into coacervate (dense phase) with a high polymer concentration and a dilute phase.

(5) In-liquid drying method: a core material is dispersed in a solution of a wall membrane material the core material dispersed liquid is put in another liquid, in which the continuous phase of the core material dispersed liquid do not blend, to form a multiple emulsion, then the medium in which the wall membrane material is dissolved is gradually removed to form wall membranes.

(6) Melting-dispersion-cooling process: a wall membrane material that melts when heated and solidifies at normal temperature is liquefied by heating, core material particles are dispersed in the resulting liquid, and then the liquid is changed into fine particles and cooled to form wall membranes.

(7) In-air suspension coating method: powder of core material particles are suspended in air using a fluid bed, and a coating liquid used as a wall membrane material is sprayed in the air to form wall membranes.

(8) Spray drying method: an undiluted encapsulation liquid is sprayed and brought into contact with heated air to evaporate its volatile matter content and thereby to form wall membranes.

(9) Acidification deposition method: an organic polymer, at least a part of the anionic groups of which is neutralized with a basic compound to give it water solubility, is kneaded together with a colorant in an aqueous medium, neutralized or acidified using an acidic compound so that the organic polymer is deposited and fixed to the colorant, and then neutralized again and dispersed.

(10) Phase inversion emulsification: water is put in an organic solvent phase made of a mixture of a colorant and an anionic organic polymer having water dispersibility, or the organic solvent phase is put in water.

As a material for the wall membrane of a microcapsule, the following organic polymers (resins) may be used: polyamide, polyurethane, polyester, polyurea, epoxy resin, polycarbonate, urea resin, melamine resin, phenolic resin, polysaccharide, gelatin, acacia gum, dextran, casein, protein, natural rubber, carboxypolymethylene, polyvinyl alcohol, polyvinyl pyrrolidone, polyvinyl acetate, polyvinyl chloride, polyvinylidene chloride, cellulose, ethyl cellulose, methyl cellulose, cellulose nitrate, hydroxyethyl cellulose, cellulose acetate, polyethylene, polystyrene, polymer or copolymer of (metha)acrylic acid, polymer or copolymer of (metha)acrylic acid ester, (metha)acrylic acid-(metha)acrylic acid ester copolymer, styrene-(metha)acrylic acid copolymer, styrene-maleic acid copolymer, alginic acid soda, fatty acid, paraffin, bees wax, water wax, hardened tallow, carnauba wax, and albumin.

Among them, organic polymers having an anionic group such as a carboxylic group or a sulfonic group are preferable. Also, nonionic organic polymers such as polyvinyl alcohol, polyethylene glycol monomethacrylate, polypropylene glycol monomethacrylate, methoxypolyethylene glycol monomethacrylate, (copolymers of the preceding substances, and cationic ring-opening polymer of 2-oxazoline may be used. Especially, completely saponified polyvinyl alcohol is preferable because of its low water solubility (it is easily soluble in hot water but not in cold water).

The amount of organic polymer in a wall membrane material for microencapsulation is preferably 1-20 mass percent with respect to a water-insoluble colorant such as an organic pigment or carbon black. Keeping the amount of organic polymer within the above range prevents the organic polymer coating the surface of a pigment from inhibiting the color development of the pigment. When the amount of an organic polymer is less than 1 mass percent, the effect of encapsulation becomes insufficient. When the amount of an organic polymer is more than 20 mass percent, the color development of a pigment is inhibited greatly. When other factors are also taken into account, the amount of organic polymer is more preferably 5-10 mass percent with respect to a water-insoluble colorant.

With the amount of an organic polymer is within the above range, a part of a colorant is substantially left uncoated or exposed, and therefore the color development of the colorant is not inhibited. From a different point of view, a colorant is substantially coated or not exposed, and therefore a sufficient encapsulation effect can be obtained. The number average molecular weight of an organic polymer is preferably 2,000 or more to efficiently perform encapsulation. "Substantially left uncoated or exposed" in this case means that a part of a colorant is intentionally left uncoated and does not include cases where a part of a colorant is exposed because of a defect such as a pinhole or a crack in the coating.

Using a self-dispersing organic pigment or a self-dispersing carbon black as a colorant gives high dispersibility to a microencapsulated pigment even when the content of an organic polymer in the capsule is relatively low. Therefore, a self-dispersing organic pigment and a self-dispersing carbon black are preferable as colorants to give sufficient preservation stability to an ink.

It is preferable to select an appropriate organic polymer depending on the method of microencapsulation. For the interface polymerization method, for example, polyester, polyamide, polyurethane, polyvinyl pyrrolidone, and epoxy resin are preferable. For the in-situ polymerization method, polymer or copolymer of (metha)acrylic acid ester, (metha) acrylic acid-(metha)acrylic acid ester copolymer, styrene-(metha)acrylic acid copolymer, polyvinyl chloride, polyvinylidene chloride, and polyamide are preferable. For the in-liquid curing coating method, alginic acid soda, polyvinyl alcohol, gelatin, albumin, and epoxy resin are preferable. For the coacervation method, gelatin, cellulose, and casein are preferable. Other microencapsulation methods may also be used to obtain a fine, uniform microencapsulated pigment.

For the phase inversion emulsification method and the acidification deposition method, anionic organic polymers may be used.

In the phase inversion emulsification method, one of the following may be used as an organic solvent phase: a mixture of an anionic organic polymer having self-dispersibility or solubility in water and a colorant such as a self-dispersing organic pigment or a self-dispersing carbon black; and a mixture of a colorant such as a self-dispersing organic pigment or a self-dispersing carbon black, a curing agent, and an anionic organic polymer. Water is put in the organic solvent phase or the organic solvent phase is put in water. The organic solvent phase self-disperses (inversion emulsification) and the colorant is microencapsulated. In the phase inversion emulsification method, a recording liquid vehicle or additives may also be mixed in the organic solvent phase. To directly produce a dispersion liquid for a recording liquid, it is preferable to mix a recording liquid medium.

In the acidification deposition method, a part or all of the anionic group of an organic polymer is neutralized with a basic compound; the organic polymer is kneaded together with a colorant such as a self-dispersing organic pigment or a self-dispersing carbon black in an aqueous medium; and the pH of the organic polymer is neutralized or acidified using an acidic compound so that the organic polymer is deposited and fixed to the colorant. Then, a part or all of the anionic groups of the resulting hydrated cake is neutralized with a basic compound so that the colorant is microencapsulated. As a result, an aqueous dispersion liquid containing fine microencapsulated anionic pigment is produced.

As a solvent in the above described microencapsulation methods, the following substances may be used: an alkyl alcohol such as methanol, ethanol, propanol, or butanol; an aromatic hydrocarbon such as benzole, toluole, or xylole; an ester such as methyl acetate, ethyl acetate, or butyl acetate; a chlorinated hydrocarbon such as chloroform or ethylene dichloride; a ketone such as acetone or methyl isobutyl ketone; an ether such as tetrahydrofuran or dioxane; and a cellosolve such as methyl cellosolve or butyl cellosolve. Microcapsules prepared as described above are separated from the solvent by centrifugation or filtration. The separated microcapsules are stirred together with water and a solvent to form a recording liquid. The average particle diameter of a microencapsulated pigment prepared as described above is preferably between 50 and 180 nm.

Such a pigment coated with resin as described above adheres firmly onto a recording medium and therefore improves abrasion resistance of printed matter.

To obtain a water-based high-penetration pigmented ink with a desirable property or to prevent clogging of recording head nozzles, it is preferable to add a water-soluble organic solvent along with a colorant. As a water-soluble organic solvent, a humectant or a penetrant may be used.

A humectant is used to prevent clogging of recording head nozzles caused by drying.

As a humectant, the following substances may be used: a polyhydric alcohol such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, or petriol; a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, or propylene glycol monoethyl ether; a polyhydric alcohol aryl ether such as ethylene glycol monophenyl ether or ethylene glycol monobenzyl ether; a nitrogen containing heterocyclic compound such as N-methyl-2-pyrrolidone, N-hydroxyethyl-2-pyrrolidone, 2-pyrrolidone, 1,3-dimethyl imidazolidinone, or ε-caprolactam; an amide such as formamide, N-methylformamide, or N,N-dimethylformamide; an amine such as monoethanolamine, diethanolamine, triethanolamine, monoethylamine, diethylamine, or triethylamine; a sulfur-containing compound such as dimethyl sulfoxide, sulfolane, or thiodiethanol; propylene carbonate; ethylene carbonate; and γ-butyrolactone. The above humectants are mixed with water and may be used individually or in combination.

A penetrant is used to improve the wettability between a recording liquid and a recording medium and to adjust the infiltration rate of a recording liquid.

Penetrants expressed by formulas (19) through (23) are especially preferable.

Surfactants such as a polyoxyethylene alkyl phenyl ether surfactant represented by formula (19), an acetylene glycol surfactant represented by formula (20), a polyoxyethylene alkyl ether surfactant represented by chemical formula (21), a polyoxyethylene polyoxypropylene alkyl ether surfactant represented by chemical formula (22), and a fluorinated surfactant represented by chemical formula (23) reduce the surface tension of a recording liquid, improve the wettability between the recording liquid and a recording medium, and therefore increase the infiltration rate of the recording liquid.

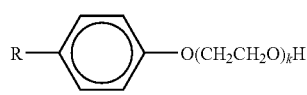

(19)

In formula (19), R indicates a hydrocarbon chain with 6-14 carbon atoms. The hydrocarbon chain may be branched. k indicates an integer between 5 and 20.

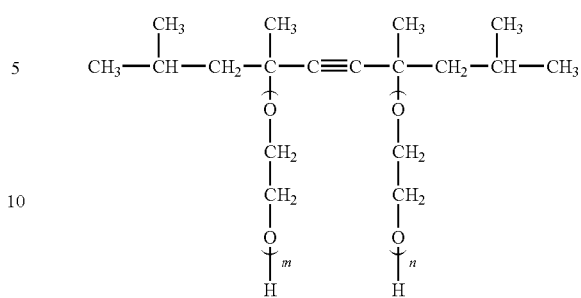

(20)

In formula (20), m and n indicate integers between 0 and 40.

$$R\text{—}(OCH_2CH_2)_n H \quad (21)$$

In formula (21), R indicates a hydrocarbon chain with 6-14 carbon atoms. The hydrocarbon chain may be branched. n indicates an integer between 5 and 20.

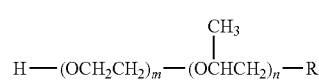

(22)

In formula (22), R indicates a hydrocarbon chain with 6-14 carbon atoms. m and n indicate integers equal to or lower than 20.

$$CF_3CF_2(CF_2CF_2)_m\text{—}CH_2CH_2\text{—}O\text{—}(CH_2CH_2O)_n H \quad (23)$$

In formula (23), m indicates an integer between 0 and 10, and n indicates an integer between 0 and 40.

In addition to the surfactants represented by chemical formulas (19) through (23) above, the following substances may be used: a polyhydric alcohol alkyl ether or a polyhydric alcohol aryl ether such as ethylene glycol monophenyl ether, ethylene glycol monoallyl ether, diethylene glycol monophenyl ether, diethylene glycol monobutyl ether, propylene glycol monobutyl ether, or tetraethylene glycol chlorophenyl ether; a nonionic surfactant such as polyoxyethylene polyoxypropylene block copolymer; a fluorinated surfactant; and a lower alcohol such as ethanol or 2-propanol.

Among them, a fluorinated surfactant is especially preferable for use with a commercial printing paper.

As a fluorinated surfactant, perfluoroalkyl sulfonate, perfluoroalkyl carboxylate, perfluoroalkyl phosphate ester, perfluoroalkyl ethylene oxide adduct, perfluoroalkyl betaine, or perfluoroalkyl amine oxide compound may be used. Especially, the fluorinated surfactant represented by (23) is preferable in terms of reliability.

The surface tension of a recording liquid or a high penetration pigmented ink according to an embodiment of the present invention is preferably 35 mN/m or lower for use with a commercial printing paper. Keeping the surface tension of a recording liquid within the above range improves the wettability between the recording liquid and a commercial printing paper (improves the penetration capability of the recording liquid) while enabling normal formation of ink drops and thereby improves fixation of the recording liquid.

The viscosity of a recording liquid is preferably between 1.0 and 20.0 cP (1.0 and 20.0 mPa·s), and more preferably between 3.0 and 10.0 cP (3.0 and 10.0 mPa·s) to improve ink jetting performance.

A recording liquid according to an embodiment of the present invention may also contain a pH adjuster. As pH adjusters, the following substances may be used: hydroxides of alkali metals such as lithium hydroxide, sodium hydroxide, and potassium hydroxide; carbonates of alkali metals such as ammonium hydroxide, quaternary ammonium hydroxide, quaternary phosphonium hydroxide, lithium carbonate, sodium carbonate, and potassium carbonate; amines such as diethanolamine and triethanolamine; boric acid; hydrochloric acid; nitric acid; sulfuric acid; and acetic acid. The pH of a recording liquid is preferably between 3 and 11, and more preferably between 6 and 10 to prevent corrosion of metallic parts that contact the recording liquid.

A recording liquid according to an embodiment of the present invention may also contain an antiseptic or a fungicide. Mixing an antiseptic or a fungicide prevents growth of bacteria, improves preservation stability, and thereby contributes to maintaining image quality. The following substances may be used as antiseptics or fungicides: benzotriazole, sodium dehydroacetate, sodium sorbate, 2-pyridinethiol-1-oxide sodium, isothiazolin compound, sodium benzoate, and pentachlorophenol sodium.

A recording liquid according to an embodiment of the present invention may also contain a rust inhibitor. A rust inhibitor coats the surfaces of metallic parts such as a recording head that contact a recording liquid and thereby prevents corrosion. The following substances may be used as rust inhibitors: acidic sulfite, sodium thiosulfate, ammonium thiodiglycolic acid, diisopropyl ammonium nitrite, pentaerythritol tetranitrate, and dicyclohexyl ammonium nitrite.

A recording liquid according to an embodiment of the present invention may also contain an antioxidant. An antioxidant prevents corrosion by eliminating radical species that cause corrosion. There are two major types of antioxidants: a radical acceptor type and a peroxide se type. A radical acceptor type antioxidant stabilizes peroxides of generated radicals by providing the peroxides with protons. A peroxide decomposition type antioxidant transforms hydroperoxides into stable alcohol. As radical acceptor type antioxidants, phenolic compounds and amine compounds are mainly used.

Examples of phenolic compounds include compounds such as hydroquinone and gallate; and hindered phenolic compounds such as 2,6-di-tert-butyl-p-cresol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-di-tert-butyl-4-hydroxybenzyl)isocyanurate, and tetrakis[methylene-3(3',5'-di-tert-butyl-4-hydroxyphenyl)propionate]methane.

Examples of amine compounds include N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diamino-diphenylmethane.

As peroxide decomposition type antioxidants, sulfur compounds and phosphorus compounds are mainly used. Examples of sulfur compounds include dilauryl thiodipropionate, distearyl thiodipropionate, lauryl stearyl thiodipropionate, dimyristyl thiodipropionate, distearylβ,β'-thiodibutyrate, 2-mercaptobenzoimidazole, and dilauryl sulfide. Examples of phosphorus compounds include triphenyl phosphite, trioctadecyl phosphite, tridecyl phosphite, trilauryl trithiophosphite, diphenyl isodecyl phosphite, trinonyl phenyl phosphite, and distearyl pentaerythritol phosphite.

Adding a fluorinated surfactant along with a water-soluble solvent (1,3-butanediol and ethyl hexanediol) gives practical penetration capability to an ink even on commercial printing papers that have lower permeability than inkjet printing papers.

However, even a high penetration pigmented ink as described above may not be quickly fixed on a commercial printing paper having low permeability and may cause beading.

Figure 12A:
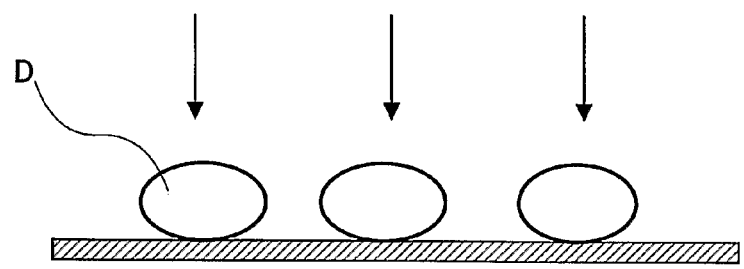
FIGS. 12A through 12C are drawings illustrating exemplary behavior of ink drops on a silk gloss papers an inkjet printing paper, and a commercial printing paper.
Figure 12B:
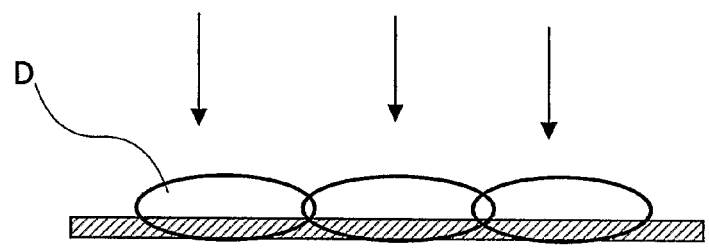
Figure 12C:
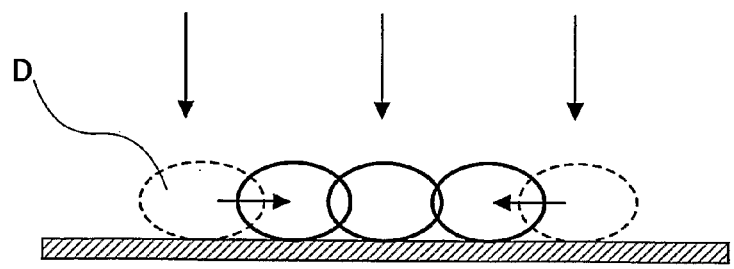

FIGS. 12A through 12C are drawings illustrating exemplary behavior of ink drops on a silk gloss paper, an inkjet printing paper, and a commercial printing paper.

FIG. 12A shows exemplary behavior of ink drops on a silk gloss paper; 12B shows exemplary behavior on an inkjet printing paper; and 12C shows exemplary behavior on a commercial printing paper. When ink drops D are jetted onto a silk gloss paper, the ink drops D do not spread and are isolated from each other. On an inkjet printing paper, the ink drops D spread and bleed.

On a commercial printing paper, the ink drops D do not spread or bleed as in the case of a plain paper and are not isolated from each other as in the case of a silk gloss paper. Instead, however, adjoining ink drops D tend to clump together and may cause beading.

As described above, to obviate the above problems and to improve image quality, an exemplary inkjet recording apparatus according to an embodiment of the present invention uses a high-penetration pigmented ink for image recording on a commercial printing paper and includes an image processing unit configured to obtain an output halftone level by performing halftone processing on input image data, to select a dot arrangement order according to the obtained output halftone level, and thereby to generate dot data where dots are arranged in a grid-like pattern. Also, the exemplary inkjet recording apparatus is configured to record the dots in a staggered arrangement where positions of the dots in odd/even-numbered columns or odd/even-numbered rows in the dot data are shifted in the sub-scanning direction or in the main-scanning direction.

Exemplary halftone processing as image processing according to an embodiment of the present invention is described below. In the exemplary halftone processing, the number of dots are controlled by pseudo halftoning such as a dither method and an error diffusion method.

An exemplary dither matrix used in a dither method according to an embodiment of the present invention is designed to convert input image data having M input halftone levels into output image data having N (M>N>2) output halftone levels. In the exemplary dither matrix, multiple submatrices are arranged at a screen angle without overlap and with no space between them so that output pixels form a halftone dot pattern or screen lines. For an output halftone level that is lower than a threshold level T (N>T>1), submatrices with a concentration-type dot arrangement order are used so that dots are formed close to each other. For an output halftone level that is equal to or higher than the threshold level T, submatrices with a dispersion-type dot arrangement order are used so that dots are formed dispersively.

Exemplary dither matrices used in a dither method (image processing method) according to an embodiment of the present invention are described below with reference to FIGS. 13 and 14. FIG. 13 is a drawing illustrating exemplary dither matrices used in an image processing method where dots are represented by four output halftone levels (no dot=0, small-size dot=1, medium-size dot=2, large-size dot=3).

In the exemplary image processing method according to an embodiment of the present invention, the output halftone level of a pixel in an input image is determined by comparing the density value of the pixel with threshold values in the exemplary dither matrices. When the density value of a pixel is smaller than the threshold values in a small-size dot dither matrix 301, the output halftone level of the pixel becomes 0. When the density value of the pixel is smaller than the threshold values in a medium-size dot dither matrix 302, the output halftone level of the pixel becomes 1. When the density value of the pixel is smaller than the threshold values in a large-size dot dither matrix 303, the output halftone level of the pixel becomes 2. When the density value of the pixel is equal to or larger than the threshold values in the large-size dot dither matrix 303, the output halftone level of the pixel becomes 3.

FIG. 14 is an enlarged view of the small-size dot dither matrix 301 shown in FIG. 13.

The small-size dot dither matrix 301 is defined as a table of threshold values having 20 rows and 20 columns (20×20). However, the size of a dither matrix is not limited to 20×20. For example, the size of a dither matrix may be 20×40, 40×40, or 256×256.

The small-size dot dither matrix 301 is made up of multiple submatrices 101. The submatrices 101 are used as units when arranging dots in the small-size dot dither matrix 301. The shape and arrangement of the submatrices 101 determine a halftone dot pattern or screen lines formed by the small-size dot dither matrix 301.

The shape of a submatrix is not limited to that shown in FIG. 14. A submatrix can be of any shape that can fill a dither matrix without overlap and without leaving a space.

In this embodiment, a submatrix is composed of a square of 6×6 dots and a square of 2×2 dots and forms a screen angle of $\sin(6/2)$.

Dot arrangement orders in a concentration-type submatrix and a dispersion-type submatrix are described below with reference to FIG. 15.

In a concentration-type submatrix 201 shown in FIG. 15, dots are arranged so as to concentrate around a point. On the other hand, in a dispersion-type submatrix 202, dots are arranged so as not to concentrate but to disperse.

Exemplary dot arrangement orders in a concentration-type submatrix are as follows: arranging dots in ascending order of geometric linear distances from a center point, and arranging dots continuously in spiral order around a center point. Exemplary dot arrangement orders in a dispersion-type submatrix are as follows: arranging dots according to the Bayer pattern, arranging dots in such a manner that the entire dither matrix obtains high-pass filter characteristics, and arranging dots in random order. Any dot arrangement order that can form a concentrated or dispersed dot arrangement pattern may be used.

As described above, the dither matrices 301 through 303 are designed to be used in an image processing method where dot are represented by four output halftone levels (no dot=0, small-size dot=1, medium-size dot=2, large-size dot=3). In the small-size dot dither matrix 301 and the medium-size dot dither matrix 302, concentration-type submatrices (as exemplified by the concentration-type submatrix 201) are used. In the large-size dot dither matrix 303, dispersion-type submatrices (as exemplified by the dispersion-type submatrix 202) are used.

Thus, in the exemplary dither method, a concentration-type dot arrangement order is used for low output halftone levels because concentrating small dots provides favorable effects; and a dispersion-type dot arrangement order is used for high output halftone levels because concentrating large dots causes problems such as bleeding and beading. In this embodiment, a concentration-type dot arrangement order is switched to a dispersion-type dot arrangement order at a threshold level T=3 (large-size dot). However, the threshold level T is not limited to 3, but the threshold level T may be set to any output halftone level.

An exemplary switching process from a concentration-type submatrix to a dispersion-type submatrix is described below with reference to FIG. 16.

Figure 16:
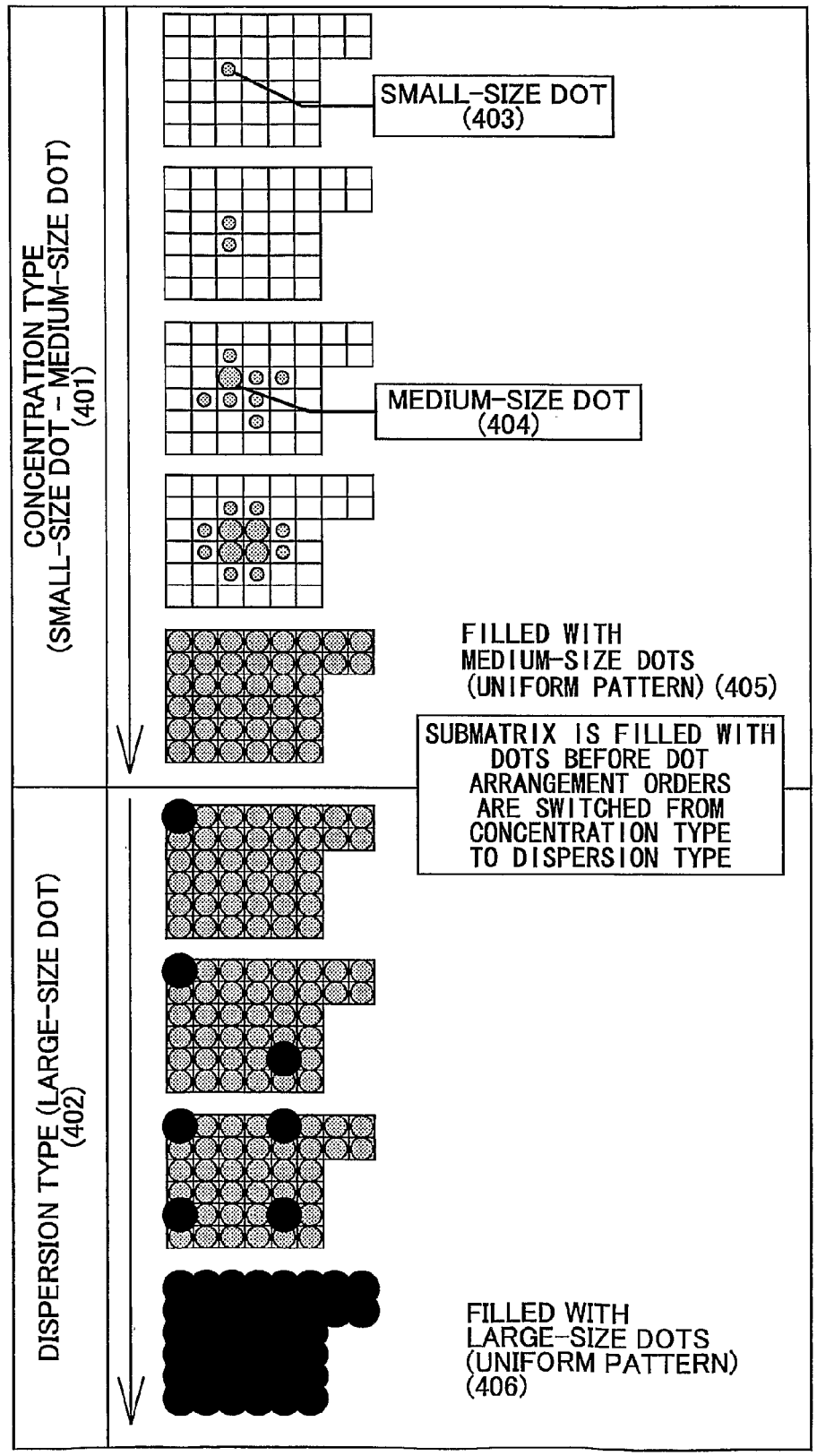
FIG. 16 is a drawing used to describe an exemplary switching process from a concentration-type submatrix to a dispersion-type submatrix.

In the example shown in FIG. 16, a dispersion-type submatrix is used for large-size dots and a concentration-type submatrix is used for small-size and medium-size dots.

In other words, small-size dots 403 and medium-size dots 404 are used to form a concentration-type dot pattern 401. The concentration-type dot pattern 401 is completed when the concentration-type submatrix is filled with dots as shown by a pattern 405. At this stage, the concentration-type submatrix is switched to a dispersion-type submatrix for a dispersion-type dot pattern 402. The dispersion-type dot pattern 402 is formed using large-size dots based on the pattern 405 filled with medium-size dots.

Figure 17:
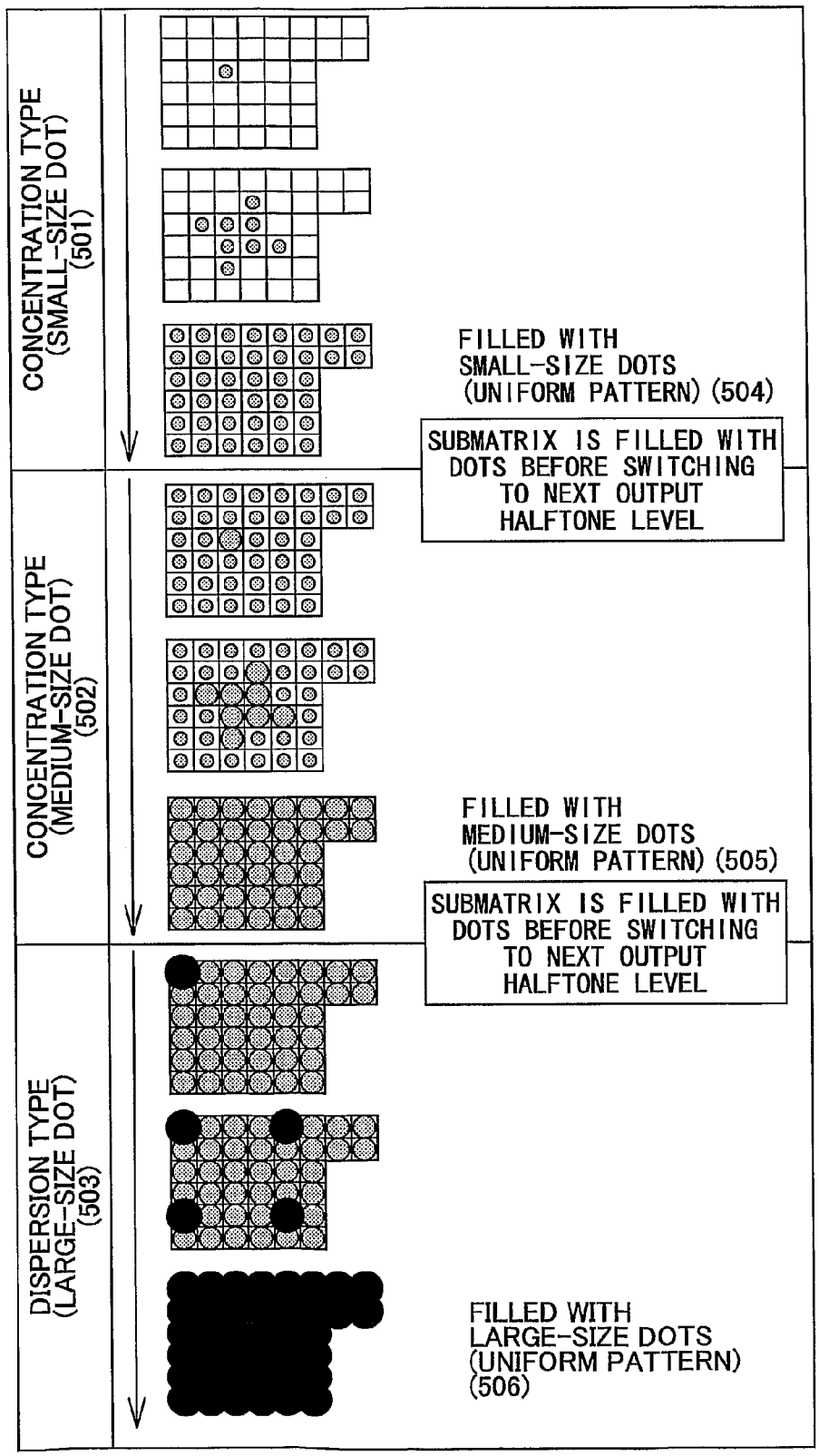
FIG. 17 is a drawing illustrating another exemplary switching process where a submatrix for an output halftone level is filled before it is switched to a submatrix for the next output halftone level.

FIG. 17 is a drawing illustrating another exemplary switching process where a submatrix for an output halftone level is filled before it is switched to a submatrix for the next output halftone level.

In the exemplary switching process shown in FIG. 17, a concentration-type submatrix is filled with dots before it is switched to a dispersion-type submatrix in substantially the same manner as the exemplary switching process shown in FIG. 16, and also the concentration-type submatrix is filled (as shown by a pattern 504) with dots at the first switching point of halftone levels (from small-size dot to medium-size dot).

Figure 18:
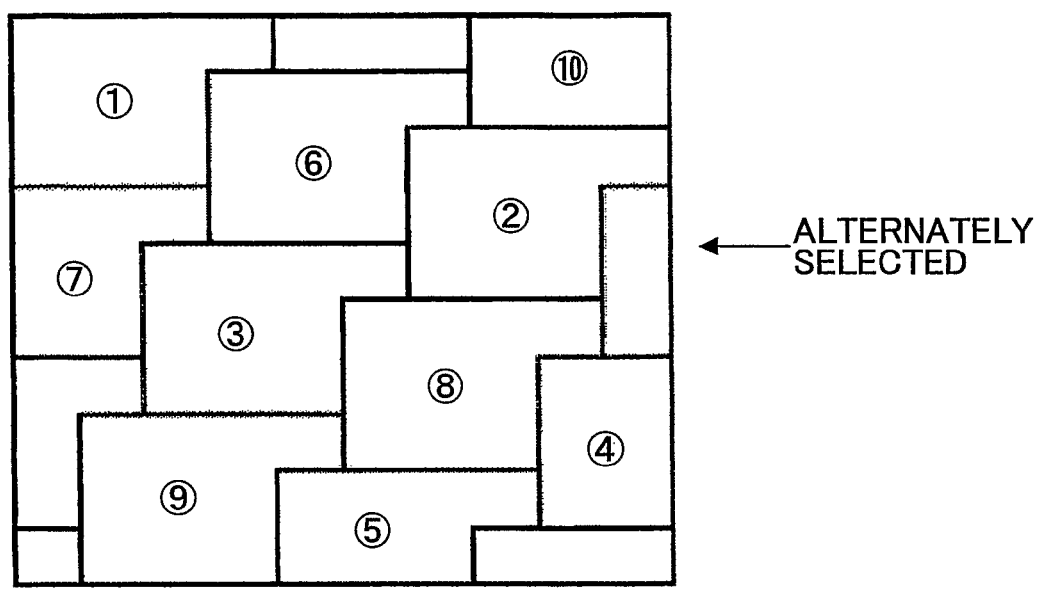
FIG. 18 is a drawing used to describe an exemplary order of assigning dots to multiple submatrices in a dither matrix.

FIG. 18 is a drawing used to describe an exemplary order of assigning dots to multiple submatrices in a dither matrix.

In the example shown in FIG. 18, dots are assigned to submatrices in the order indicated by circled numbers 1 through 10. In this exemplary dot assignment order, the submatrices are selected alternately in oblique directions so that adjoining submatrices are not selected consecutively. In other words, the dots are assigned to the submatrices in such an order that the assigned dots are arranged dispersively in the dither matrix. The dot assignment order or the submatrix selection order is not limited to that described above as long as the assigned dots are arranged dispersively in the dither matrix. For example, submatrices may be selected in random order or in such an order that the arranged dots obtain high-pass filter characteristics.

Figure 19:
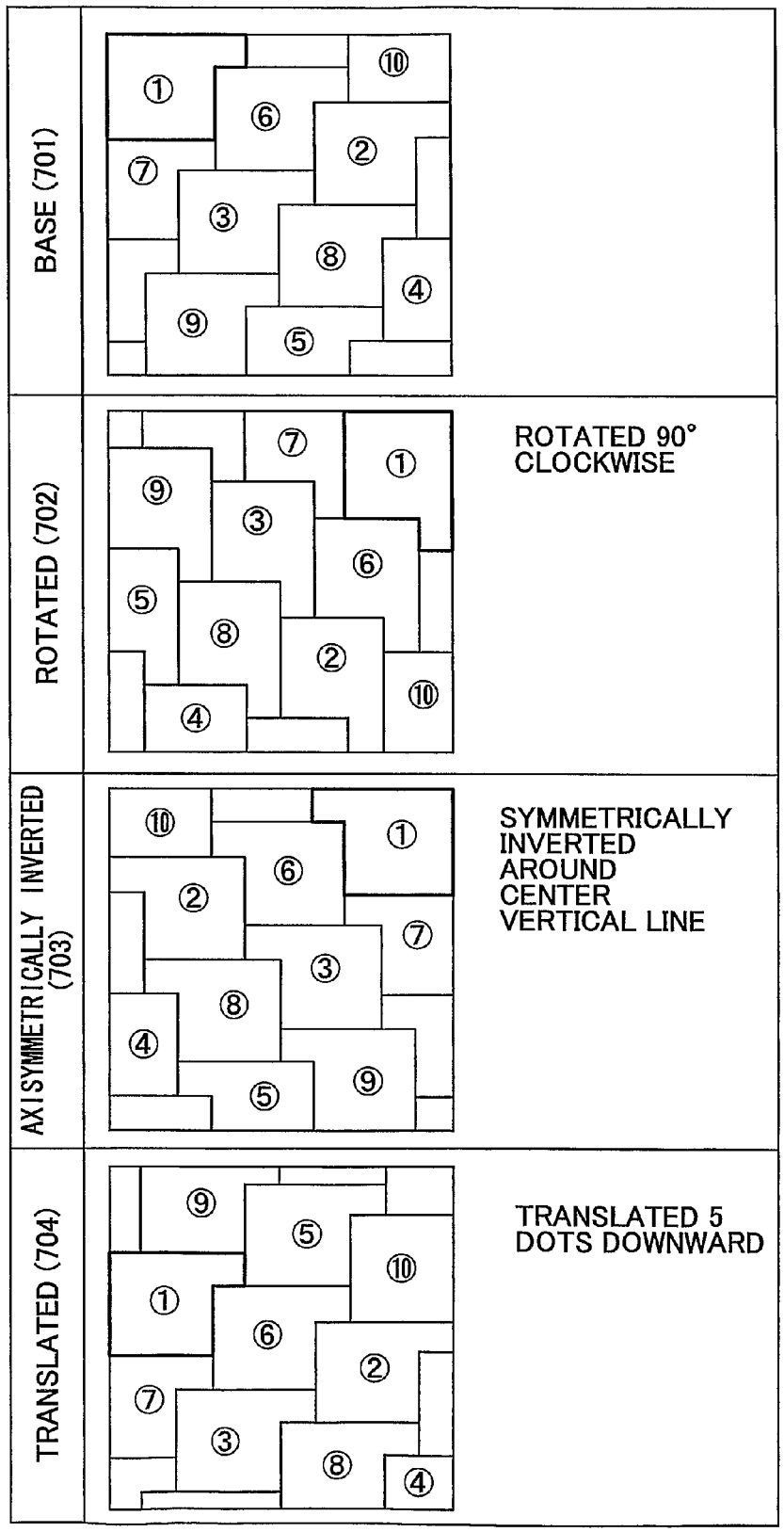
FIG. 19 is a drawing illustrating exemplary dither matrices created by rotating, inverting, or translating a base dither matrix.

FIG. 19 is a drawing illustrating a base dither matrix 701 and dither matrices 702, 703, 704 created by rotating, axi-symmetrically inverting, or translating, respectively, the base dither matrix 701.

Created dither matrices can be assigned to color planes of a color image. For example, it is possible to assign a dither matrix shown in FIG. 13 as a base matrix to the cyan color plane, a dither matrix created by translating the base matrix 5 dots downward to the black color plane, a dither matrix created by translating the base matrix 10 dots downward to the magenta color plane, and a dither matrix created by translating the base matrix 15 dots downward to the yellow color plane.

Figure 20:
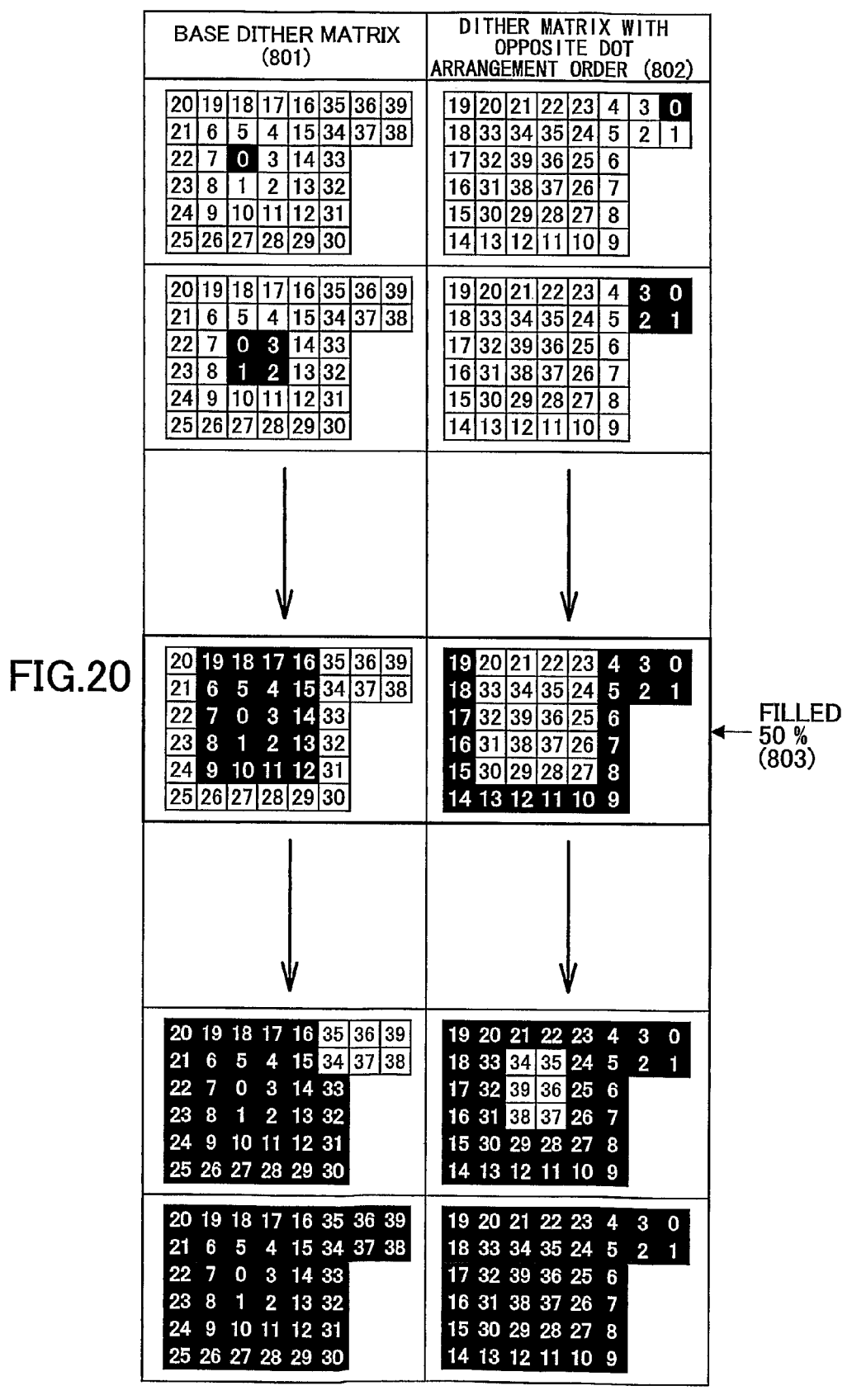

FIG. 20 is a drawing illustrating a base dither matrix and a dither matrix created by reversing the dot arrangement order of the base dither matrix for each output halftone level. Assigning the base dither matrix to one color plane and the created dither matrix having a reversed dot arrangement order to the other color plane makes it possible to reduce overlapping of dots of the two color planes.

As shown in FIG. 20, dots are arranged in opposite dot arrangement orders in a base dither matrix 801 and a reversed dither matrix 802. When the base dither matrix 801 is used for one color plane and the dither matrix 802 is used for the other color plane, halftone dot patterns of the two color planes do no overlap until their gradation levels exceed 50% (803).

If overlaps of color inks are uneven when forming an image having two or more color planes, color distortion may occur. Especially, gray colors are prone to color distortion.

Figure 21:
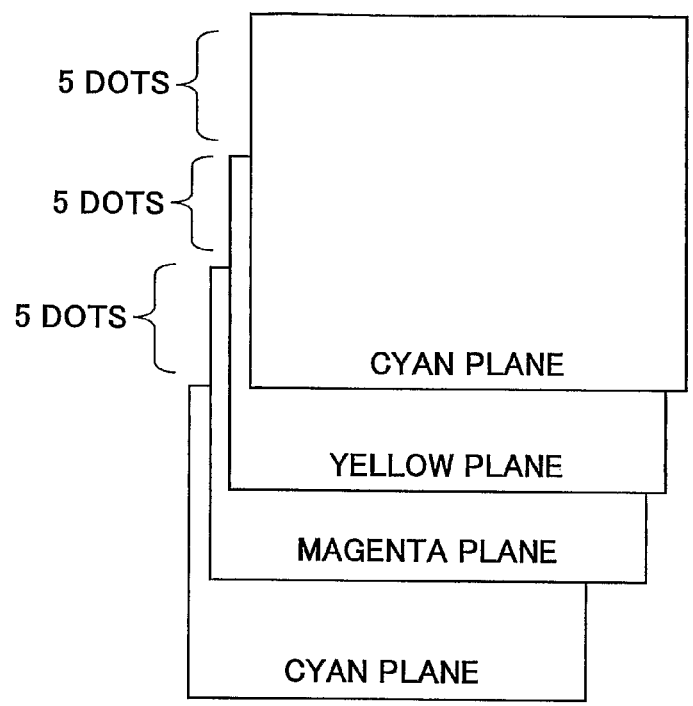
FIG. 21 is a drawing used to describe an exemplary method of achieving gray balance without using a black ink where dither matrices are translated.

According to an embodiment of the present invention, when achieving gray balance without using a black ink, dither matrices are translated as shown in FIG. 21 so that overlapping of dots of the color planes is reduced and overlaps of color inks become substantially uniform. Also, instead of translating a base dither matrix, dither matrices for the color planes may be created by rotating or inverting the base dither matrix or by changing the dot arrangement order of the base dither matrix as long as overlaps of color inks become substantially uniform with the created dither matrices.

Figure 22:
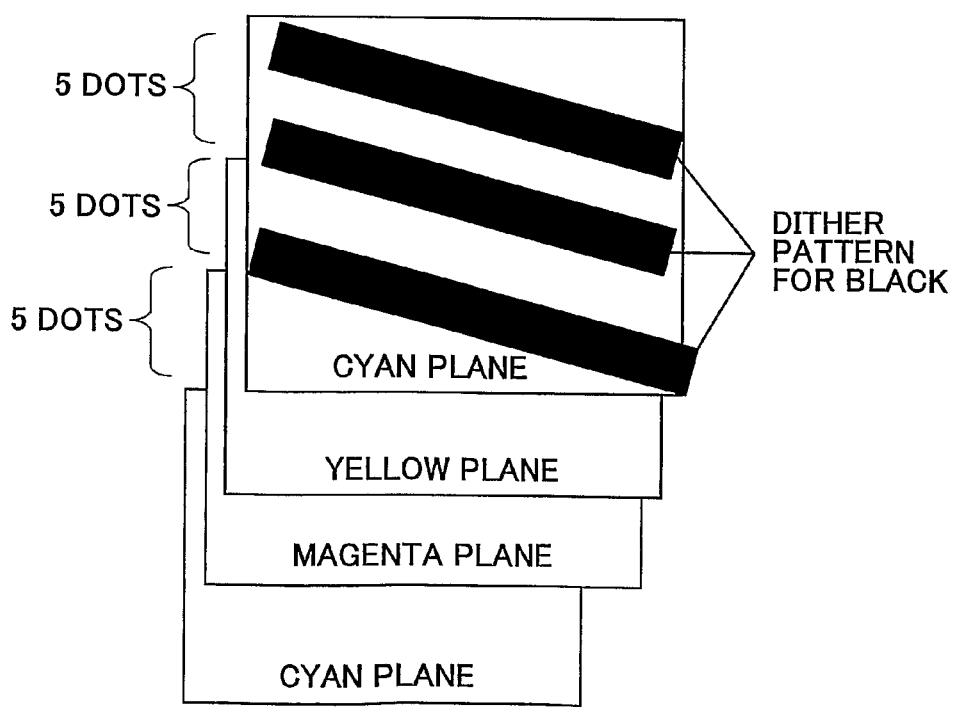
FIG. 22 is a drawing used to describe an exemplary method of achieving gray balance using a black ink where a linear dither matrix having a certain screen angle is used for black dots.

When achieving gray balance using a black ink, gray balance is first adjusted using a method as described above. In addition, as shown in FIG. 22, a linear dither matrix (dither mask) having a certain screen angle is used for the black ink so that the ratios of dots of the color planes which dots are to be overlapped by black dots become substantially the same.

As the dither mask for the black ink, instead of a linear dither matrix, a dither matrix created by rotating, inverting, or translating the base dither matrix, a dither matrix created by changing the dot arrangement order of the base dither matrix, or a Bayer dither matrix (mask) may also be used.

The exemplary dither methods (image processing methods) described above may also be used when forming an image on a recording medium other than a commercial printing paper. Also, when forming an image using a recording medium with excellent absorbency and permeability and an ink with a high penetration rate, a dither matrix that achieves higher screen frequency may be used.

As a halftone processing method, an error diffusion method using an error diffusion algorithm that converts input image data having M input halftone levels into output image data having N (M>N≧2) output halftone levels may also be used.

As described above, an exemplary inkjet recording apparatus according to an embodiment of the present invention includes an image processing unit configured to obtain an output halftone level by performing halftone processing on input image data, to select a dot arrangement order according to the obtained output halftone level, and thereby to generate dot data where dots are arranged in a grid-like pattern. Also, the exemplary inkjet recording apparatus is configured to record dots in a staggered arrangement where positions of the dots in odd/even-numbered columns or odd/even-numbered rows in the dot data are shifted in the sub-scanning direction or in the main-scanning direction. An exemplary dot arrangement method performed by the exemplary inkjet recording apparatus is described below with reference to FIGS. 23 through 26.

Figure 23:
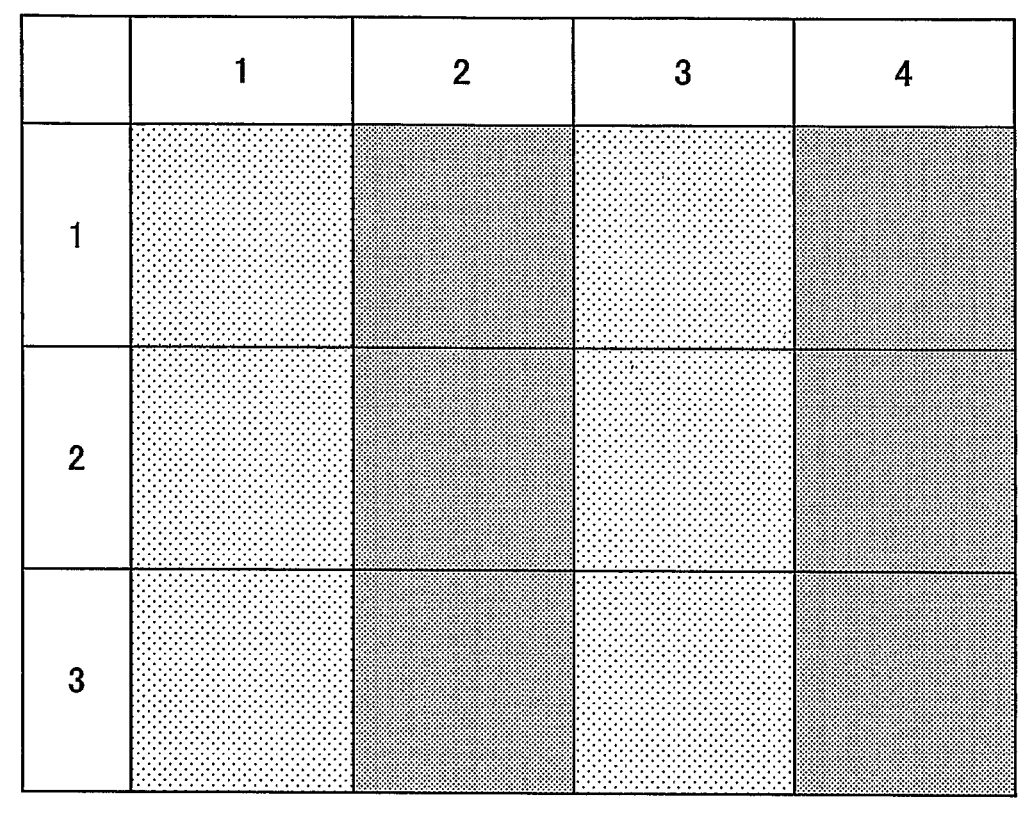

In dot data generated by, for example, a dither method as described above, dots are arranged in a grid-like pattern having rows and columns as shown in FIG. 23. According to an embodiment of the present invention, the positions of dots in even-numbered columns in the dot data are shifted one half of the pitch between adjacent dots (when the resolution of the dot data is 600 dpi, one half of the pitch is equivalent to the pitch between dots in 1,200 dpi dot data) in the sub-scanning direction (paper conveying direction) with respect to the positions of dots in odd-numbered columns. In other words, the positions of the dots in the odd-numbered columns and the even-numbered columns are staggered when the dots are formed on a recording medium.

Figure 24:
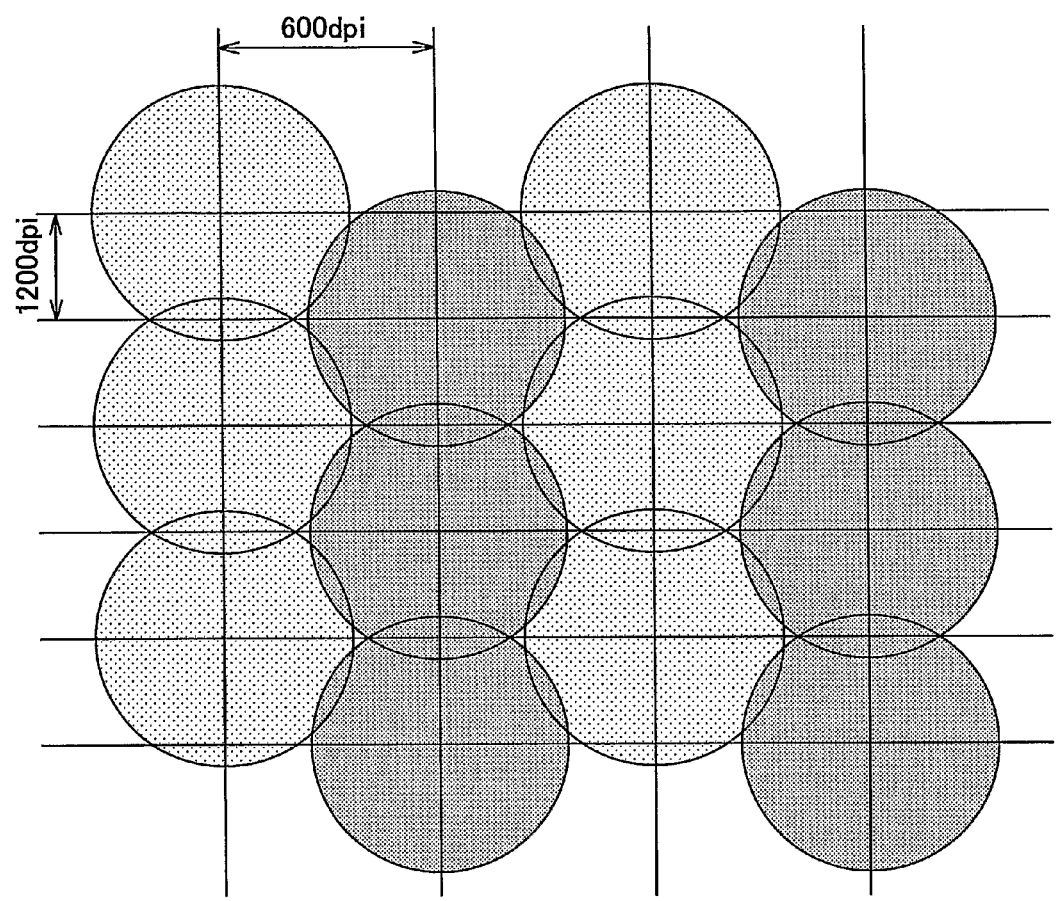
FIG. 24 is a drawing illustrating an exemplary staggered dot arrangement.

Although dots are shifted in the sub-scanning direction in FIG. 24, dots may be shifted in the main-scanning direction to stagger the positions of dots in the even-numbered rows and the odd-numbered rows.

Figure 25:
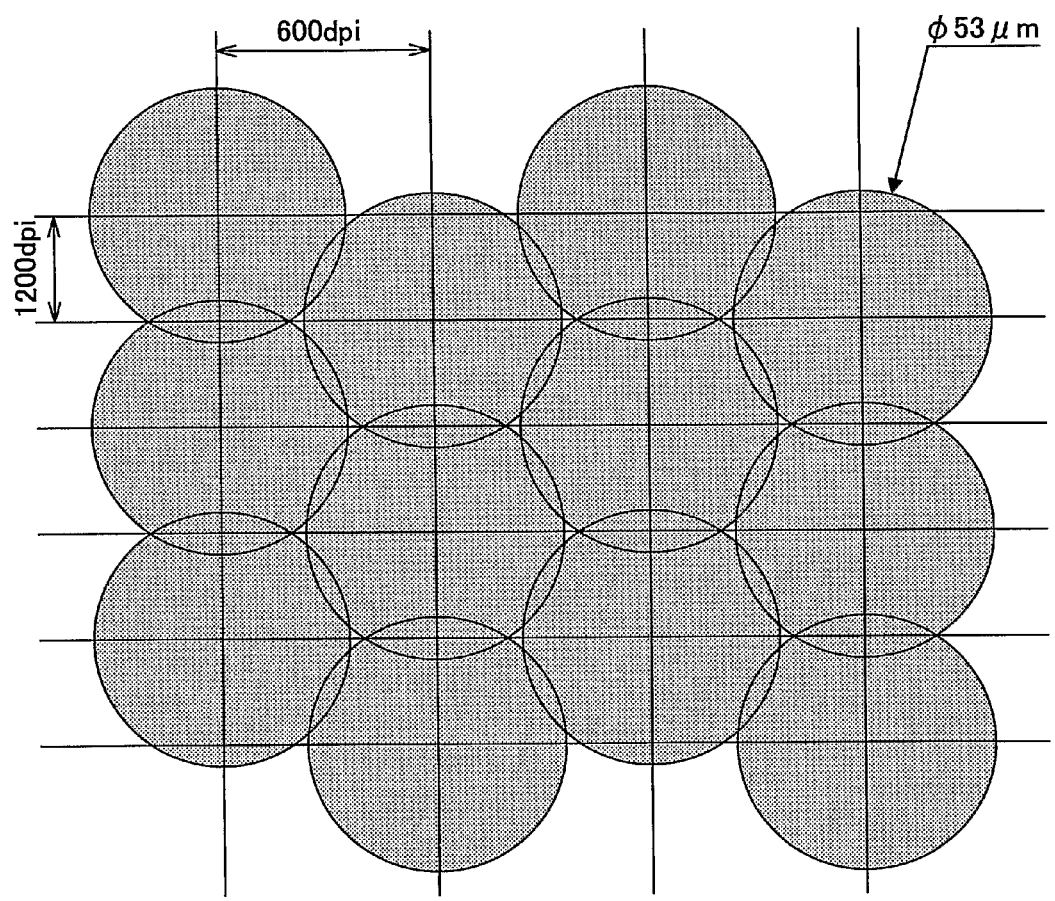
FIG. 25 is a drawing illustrating another exemplary staggered dot arrangement.
Figure 26:
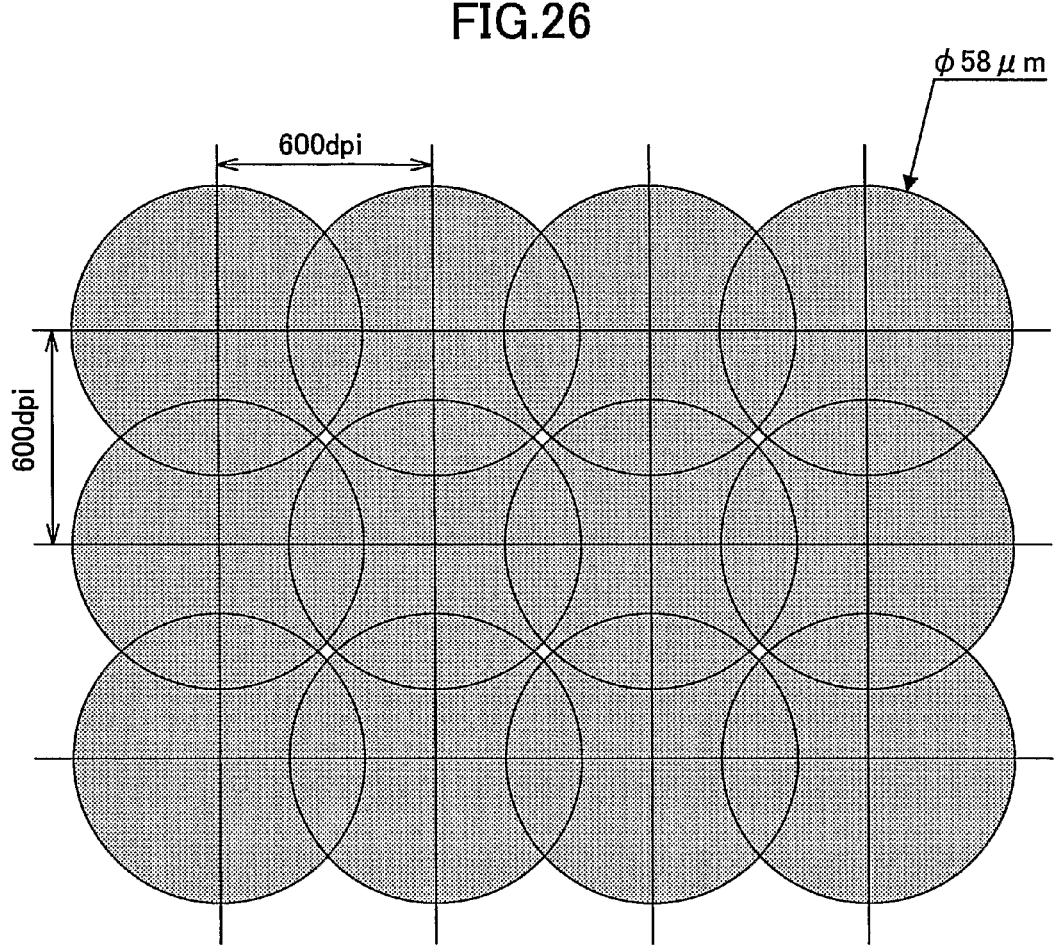
FIG. 26 is a drawing illustrating a conventional dot arrangement.

Recording dots in a staggered arrangement makes it possible to fill smaller spaces. Also, compared with a conventional dot arrangement as shown in FIG. 26, a staggered arrangement as shown in FIG. 25 makes it possible to reduce the overlaps between adjacent dots.

As described above, an error diffusion method may also be used as an image processing method.

When arranging dots in a staggered arrangement, the resolution of dot data is preferably 400 dpi or higher to prevent visible degradation of image quality which may be caused by shifting the positions of dots.

According to an embodiment of the present invention, a part or whole of the exemplary image processing method described above is implemented as an image processing program stored in a storage medium.

An inkjet recording apparatus, an image processing method, and an image processing program according to embodiments of the present invention may be configured to select the above described image processing method or a dither method that provides a higher screen frequency depending on the type of a recording medium and/or the type of a recording ink, and thereby to perform image processing suitable for the recording medium and/or the recording ink.

EXAMPLES

Examples below are provided to facilitate understanding of the present invention. However, the present invention is not limited to those examples.

(First Experiment)

Images were recorded by an inkjet recording apparatus including an image processing unit configured to select a dot arrangement order according to an output halftone level obtained by performing halftone processing on input image data. For the experimental recording, commercial printing papers and high-penetration pigmented inks described below were used.

[Commercial Printing Paper]

A commercially available coated paper for offset printing (brand name: Aurora Coat, grammage=104.7 g/m$^2$, Nippon Paper Industries Co., Ltd.) and a commercially available coated paper for electrophotographic printing (brand name: POD Gloss Coat, grammage=100 g/m$^2$, Oji paper Co., Ltd.) were used.

The amount of pure water transferred onto the offset printing coated paper measured in an environmental condition of 23° C. and 50% RH by a dynamic scanning absorptometer was 2.8 ml/m$^2$ after a contact time of 100 ms and 3.4 ml/m$^2$ after a contact time of 400 ms. The amount of pure water transferred onto the electrophotographic printing coated paper measured in an environmental condition of 23° C. and 50% RH by a dynamic scanning absorptometer was 3.1 ml/m$^2$ after a contact time of 100 ms and 3.5 ml/m$^2$ after a contact time of 400 ms.

[High-Penetration Pigmented Ink]

—Black Ink—

To produce a black ink, substances including a carbon black dispersion (sulfone group attached, self-dispersion type) manufactured by Cabot Corporation listed in a formula below were mixed and stirred, and then filtered with a 0.8 µm polypropylene filter. The surface tension of the produced black ink was 25.0 mN/m.

—Black Ink Formula—
Carbon black dispersion: 40 wt %
CAB-O-JET 200 (sulfone group attached, Cabot Corporation)
Acrylic silicone resin emulsion: 8 wt %
Nanocryl SBCX-2821 (Toyo Ink Mfg. Co., Ltd.)
1,3-butanediol: 18 wt %
Glycerin: 9 wt %
2-pyrrolidone: 2 wt %
Ethyl hexanediol: 2 wt %
Fluorinated surfactant FS-300 (Dupont): 2 wt %
Chemical formula (V) m=6-8, n=26 or larger
Proxel LV (Avecia KK): 0.2 wt %
Ion-exchanged water: 20.8 wt %

—Color Ink—

To prepare a polymer solution, the air in a 1 L flask with a mechanical stirrer, a thermometer, a nitrogen gas inlet tube, a reflux tube, and a dropping funnel was replaced sufficiently with nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C.

Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours. After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at the temperature of 65° C., 0.8 g of azobisdimethylvaleronitrile was added to the solution, and then the solution was matured further for 1 hour. After the reaction stopped, 364 g of methyl ethyl ketone was put into the 1 L flask. As a result, 800 g of polymer solution with a concentration of 50% was obtained.

Then, 28 g of the obtained polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid were distilled away by using an evaporator. As a result, 160 g of polymer microparticle dispersion liquid with a cyan color was obtained. The solid content of the polymer microparticle dispersion liquid was 20.0 wt %.

Using the obtained polymer microparticle dispersion liquid, a color ink was prepared. More specifically, substances listed in a formula below were mixed and stirred, and then filtered with a 0.8 µm polypropylene filter to prepare the exemplary color ink. The surface tension of the produced color ink was 25.5 mN/m.

—Color Ink Formula—
Cyan polymer microparticle dispersion: 45 wt %
1,3-butanediol: 21 wt %
Glycerin: 8 wt %
Ethyl hexanediol: 2 wt %
Fluorinated surfactant FS-300 (Dupont): 1 wt %
Chemical formula (V) m=1-9, n=0-25
Proxel LV (Avecia KK): 0.5 wt %
Ion-exchanged water: 23.5 wt %

Adding a fluorinated surfactant along with a water-soluble solvent (1,3-butanediol and ethyl hexanediol) gives practical penetration capability to an ink even on commercial printing papers that have lower permeability than inkjet printing papers.

[Image Processing Unit]

An exemplary inkjet recording apparatus including an image processing unit configured to select a dot arrangement order according to an output halftone level obtained by performing halftone processing on input image data was used in the first experiment. The image processing unit was equipped with an image processing program for performing the halftone processing based on dither matrices as shown in FIG. 13.

The dot arrangement orders in submatrices of the dither matrices, the threshold level at which a dispersion-type submatrix is switched to a concentration-type submatrix, and the order of assigning dots to the submatrices were determined according to the embodiments described above with reference to FIGS. 14 through 16.

Using the exemplary inkjet recording apparatus configured as described above, dot data (image) were printed with the black ink and the color ink prepared as described above on the commercially available coated paper for offset printing and the commercially available coated paper for electrophotographic printing described above. The resolution of the dot data was set at 600 dpi. The dot data were printed by shifting the positions of dots in even-numbered columns one half of the pitch between adjacent dots (equivalent to the pitch between dots in 1,200 dpi dot data) in the sub-scanning direction (paper conveying direction) with respect to the positions of dots in odd-numbered columns. In other words, the dots in the odd-numbered columns and the even-numbered columns were printed in staggered positions.

The fixation characteristics of the black ink and the color ink were excellent and no beading and bleeding were observed. In other words, high-resolution, high-quality images (dot data) were successfully formed on the coated papers.

As the result shows, compared with a conventional dot arrangement as shown in FIG. 26, recording dots in a staggered arrangement makes it possible to fill smaller spaces and to reduce the overlaps between adjacent dots.

Also, dot data were printed using an error diffusion algorithm for the halftone processing. The quality of the formed images was also excellent.

Since the resolution of the dot data used was higher than 400 dpi (600 dpi), no visible degradation in image quality caused by shifting the positions of dots was observed.

An exemplary image forming apparatus for forming an image on a commercial printing paper using a high-penetration pigmented ink is described below with reference to FIG. 27 and FIG. 28.

Figure 27:
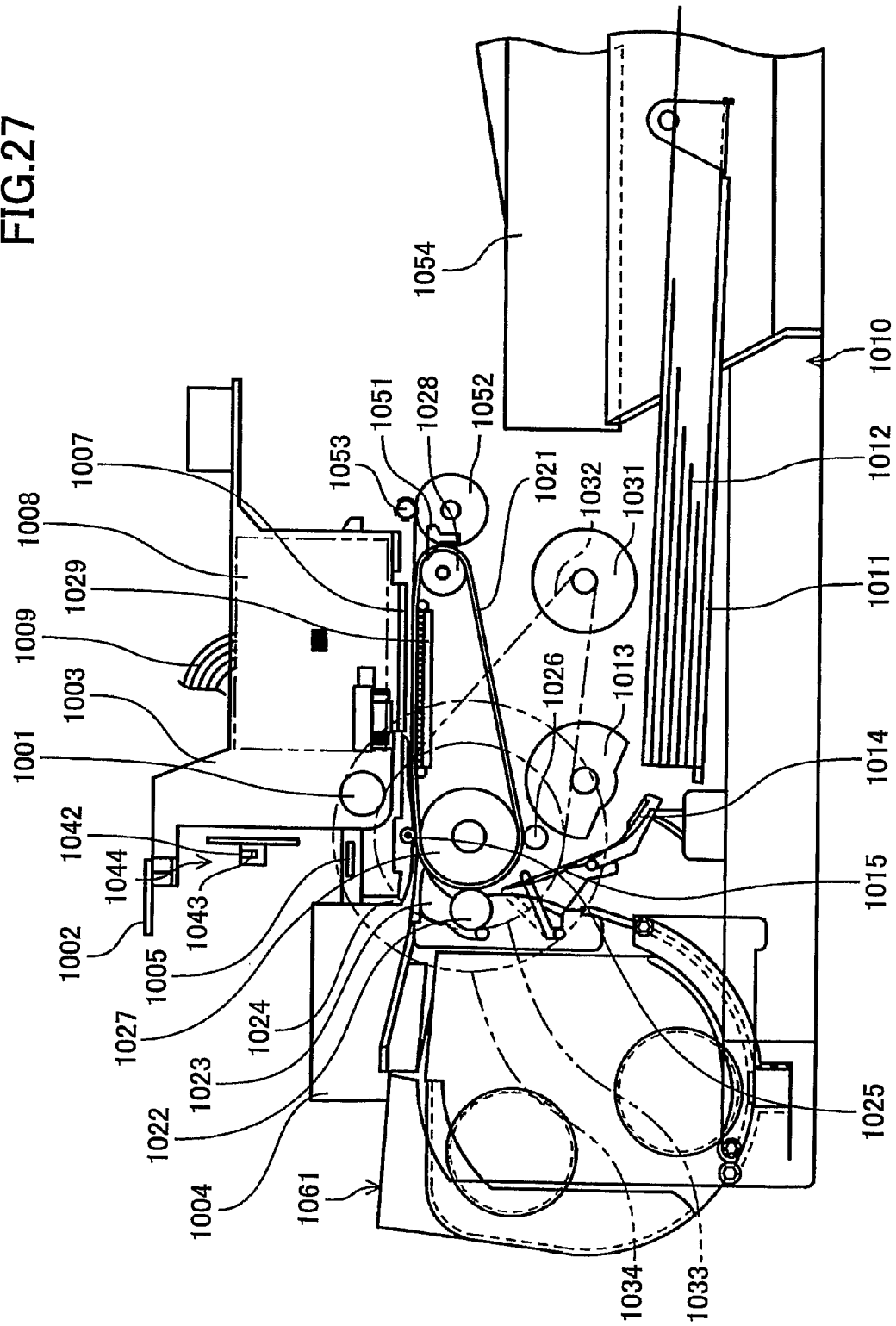
FIG. 27 is a side elevational cut-away view of an exemplary mechanical unit of an exemplary image forming apparatus.

FIG. 27 is a side elevational view of an exemplary mechanical unit of an exemplary image forming apparatus. FIG. 28 is a plan view of the exemplary mechanical unit.

Figure 28:
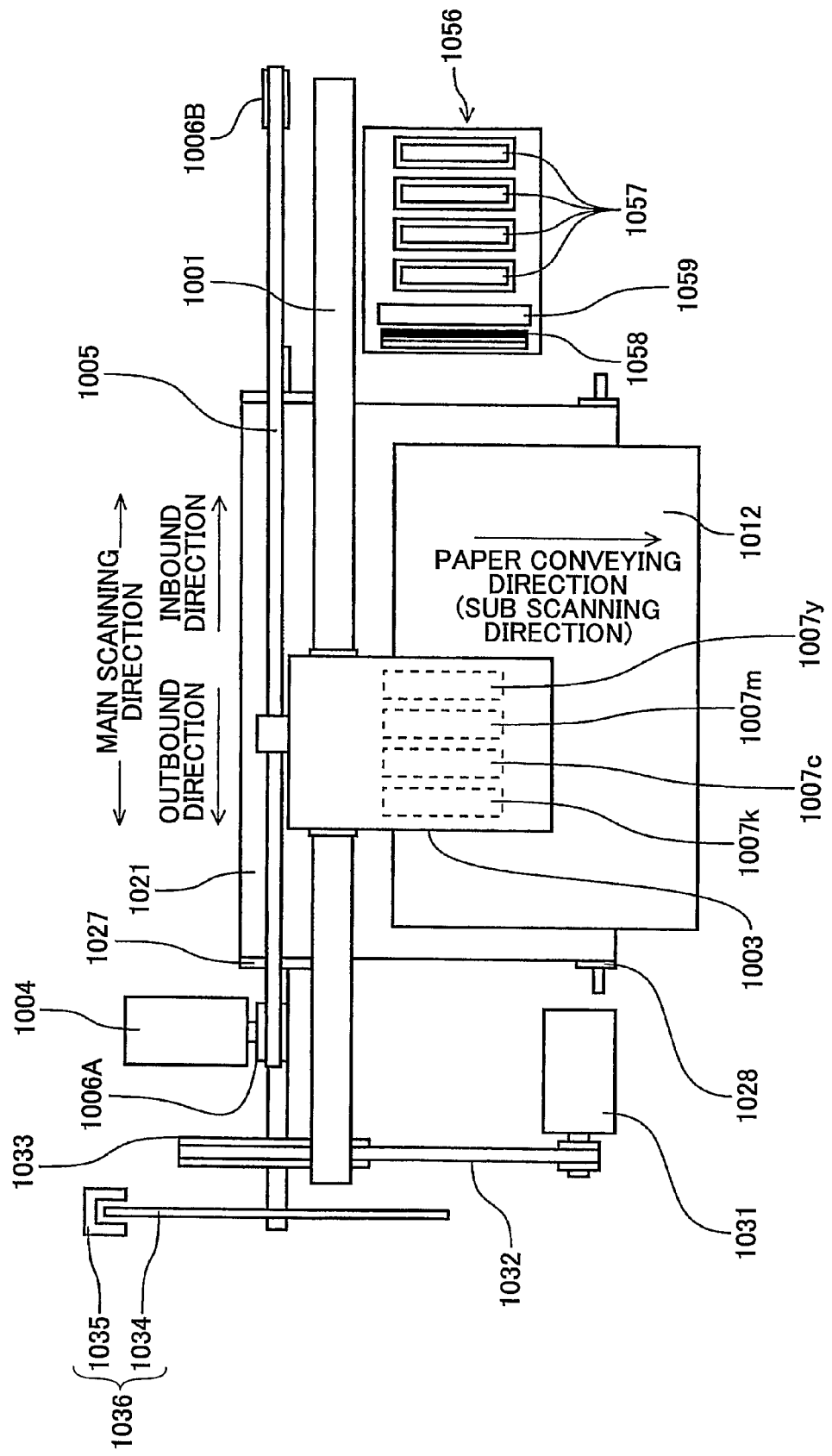
FIG. 28 is a plan view of the exemplary mechanical unit of the exemplary image forming apparatus.

In the exemplary image forming apparatus, a carriage 1003 is supported by a guiding unit, which includes a guide rod 1001 and a guide rail 1002 laid between right and left sideboards (not shown), so as to be able to slide in the directions of the arrows (main-scanning directions) shown in FIG. 28. The carriage 3 is moved in the main-scanning directions by a main scanning motor 1004 via a timing belt 1005 stretched between a drive pulley 1006A and a driven pulley 1006B.

On the carriage 1003, for example, four recording heads 1007y, 1007c, 1007m, and 1007k (collectively called recording heads 1007 for brevity and/or when color distinction is not made) that are inkjet heads for jetting ink drops of yellow (Y), cyan (C), magenta (M), and black (K), respectively, are mounted. The recording heads 1007 are arranged so that an array of inkjet nozzles of the recording heads 1007 forms a right angle with the main scanning directions and ink drops are jetted downward.

Each of the inkjet heads or the recording heads 1007 may include a pressure-generating unit for generating pressure to jet liquid drops. Examples of pressure-generating units include a piezoelectric actuator such as a piezoelectric element, a thermal actuator using liquid film boiling caused by an electrothermal converting element such as a heat element, a shape memory alloy actuator using metal phase changes caused by temperature changes, and an electrostatic actuator using static electricity. Each inkjet head may not necessarily be dedicated to one color. An inkjet head may include an array of nozzles that can jet liquid drops of multiple colors.

The carriage 1003 also includes sub-tanks 1008 for supplying color inks to the recording heads 1007. The sub-tanks 1008 are supplied with color inks from main-tanks (ink cartridges) (not shown) through ink supply tubes 1009.

The exemplary image forming apparatus also includes a paper feeding unit for feeding paper sheets 1012 stacked on a paper stacking plate (pressing plate) 1011 of a paper feed tray 1010. The paper feeding unit includes a crescent roller (paper feed roller) 1013 for separating the paper sheets 1012 and feeding them one by one from the paper stacking plate 1011, and a separating pad 1014 facing the paper feed roller 1013 and made of a material with a high friction coefficient. The separating pad 1014 is biased toward the paper feed roller 1013.

The exemplary image forming apparatus also includes a conveying unit for conveying the paper sheet 1012 fed from the paper feeding unit to a position under the recording heads 1007. The conveying unit includes a guide 1015 that guides the paper sheet 1012 fed from the paper feeding unit, a conveyor belt 1021 that electrostatically attracts and thereby conveys the paper sheet 1012, a counter roller 1022 that presses the paper sheet 1012 against the conveyor belt 1021 and thereby conveys the paper sheet 1012, a conveying guide 1023 that changes approximately 90 degrees the direction of the paper sheet 1012 being fed approximately vertically upward so that the paper sheet 1012 is laid on the conveyor belt 1021, a pressing part 1024, and a pressing roller 1025 biased by the pressing part 1024 toward the conveyor belt 1021. The exemplary image forming apparatus also includes a charging roller 1026 for charging the surface of the conveyor belt 1021.

The conveyor belt 1021 is an endless belt and is stretched between a conveying roller 1027 and a tension roller 1028. The conveyor belt 1021 is turned in the paper conveying direction (sub scanning direction) shown in FIG. 28 by the conveying roller 1027 rotated by a sub scanning motor 1031 via a timing belt 1032 and a timing roller 1033.

A guide 1029 is provided under the conveyor belt 1021 in a position corresponding to the image forming area of the recording heads 1007. The charging roller 1026 is positioned so as to contact the surface of the conveyor belt 1021 and to rotate according to the rotation of the conveyor belt 1021.

As shown in FIG. 28, the exemplary image forming apparatus also includes a rotary encoder 1036. The rotary encoder 1036 includes a slit wheel 1034 attached to the shaft of the conveying roller 1027 and an encoder sensor 1035 for detecting a slit on the slit wheel 1034.

The exemplary image forming apparatus further includes a paper ejecting unit for ejecting the paper sheet 1012 on which an image has been recorded by the recording heads 1007. The paper ejecting unit includes a sheet separating claw 1051 for separating the paper sheet 1012 from the conveyor belt 1021, a paper ejecting roller 1052, a paper ejecting roller 1053, and a paper catch tray 1054 for receiving the ejected paper sheet 1012.

A duplex unit 1061 is detachably attached to the back of the exemplary image forming apparatus. The duplex unit 1055 takes in the paper sheet 1012 that is conveyed backward by the conveyor belt 1021 turning in the opposite direction, reverses the paper sheet 1012, and feeds the paper sheet 1012 again into the space between the counter roller 1022 and the conveyor belt 1021.

Also, as shown in FIG. 28, a recording head maintenance/cleaning mechanism 1056 is provided in a non-image-forming area at one end of the scanning directions of the carriage 1003. The recording head maintenance/cleaning mechanism 1056 maintains and cleans the nozzles of the recording heads 1007.

The recording head maintenance/cleaning mechanism 1056 includes caps 1057 for covering the nozzle surfaces of the recording heads 1007, a wiper blade 1058 for wiping the nozzle surfaces, and a waste-ink receiver 1059 for receiving ink drops used for purging dried ink from the nozzles.

In the exemplary image forming apparatus configured as described above, the paper sheets 1012 are separated and fed one by one from the paper feed tray 1010, the separated paper sheet 1012 is fed approximately vertically upward and guided by the guide 1015 into the space between the conveyor belt 1021 and the counter roller 1022 so as to be conveyed further, the leading edge of the paper sheet 1012 is guided by the conveying guide 1023 and pressed by the pressing roller 1025 onto the conveyor belt 1021, and the direction of the paper sheet 1012 is thereby changed approximately 90 degrees.

At this stage, an AC bias applying unit (not shown) of a control unit described later applies an alternating voltage to the charging roller 1026. As a result, positively and negatively charged strips with a constant width are formed alternately in the paper conveying direction (sub scanning direction) on the surface of the conveyor belt 1021. When the paper sheet 1012 is conveyed onto the charged conveyor belt 1021, the paper sheet 1012 is electrostatically attracted to the conveyor belt 1021 and thereby conveyed in the sub scanning direction as the conveyor belt 1021 turns.

The recording heads 1007 are driven while moving the carriage 1003 in the main scanning directions (outbound and inbound directions) according to an image signal to jet ink drops. As a result, a line of image is formed on the paper sheet 1012 that is paused at a position. Then, the paper sheet 1012 is conveyed further a specified distance, and the next line is recorded. When a recording completion signal or a signal indicating that the bottom edge of the paper sheet 1012 has reached the image forming area is received, the exemplary image forming apparatus terminates the image forming process and ejects the paper sheet 1012 into the paper catch tray 1054.

In duplex printing, after an image is formed on the upper side (a side of the paper sheet 1012 on which an image is formed first) of the paper sheet 1012, the paper sheet 1012 is fed into the duplex unit 1061 by turning the conveyor belt 1021 in the reverse direction, reversed (so that the underside of the paper sheet 1012 faces upward) and fed again into the space between the counter roller 1022 and the conveyor belt 1021, and conveyed by the conveyor belt 1021 at controlled timings as described earlier. Thus, an image is formed on the underside of the paper sheet 1012. Then, the paper sheet 1012 is ejected onto the paper catch tray 1054.

When the exemplary image forming apparatus is idle, the carriage 1003 is moved into a position above the recording head maintenance/cleaning mechanism 1056. In this position, the nozzle surfaces of the recording heads 1007 are covered by the caps 1057 to retain moisture of the nozzles and thereby to prevent nozzle clogging caused by dried ink. With the recording heads 1007 capped by the caps 1057, the nozzles are suctioned to remove dried ink or air bubbles. The ink adhered to the nozzle surfaces of the recording heads 1007 during this recording head maintenance is wiped off by the wiper blade 1058. Also, before or during an image forming process, ink is sprayed in order to clean the nozzles. With the above measures, the ink jetting performance of the recording heads 1007 is maintained.

An exemplary inkjet head used as the recording head 1007 is described below with reference to FIGS. 29 and 30.

Figure 29:
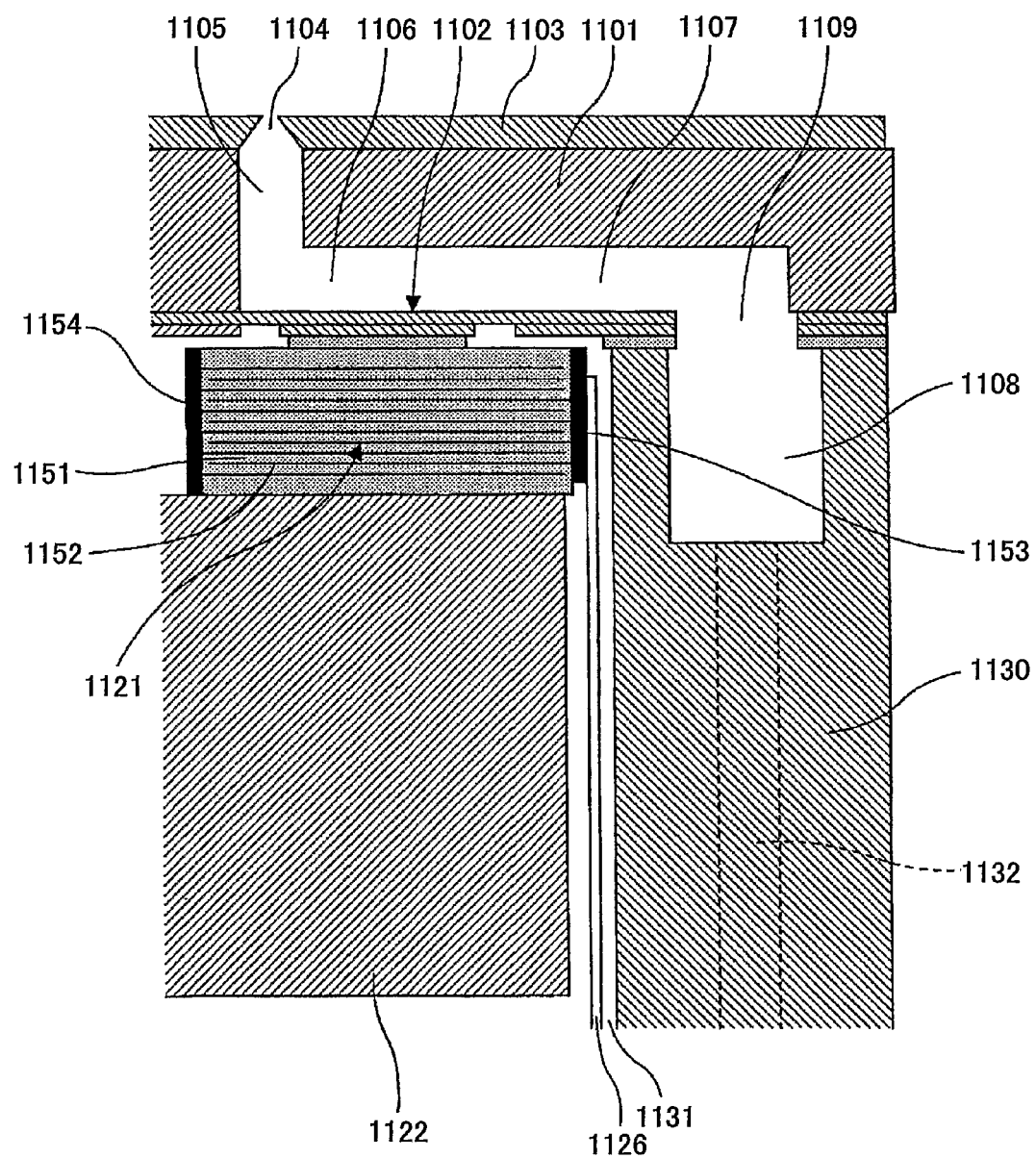
FIG. 29 is a cut-away side view of an inkjet head taken along the length of a liquid chamber.

FIG. 29 is a cut-away side view of an inkjet head taken along the length of a liquid chamber. FIG. 30 is a cut-away side view of an inkjet head taken along the width of a liquid chamber (along the direction in which nozzles are arranged).

An exemplary inkjet head includes a channel plate 1101 formed, for example, by anisotropically etching a single-crystal silicon substrate; a vibrating plate 1102 formed, for example, by electroforming nickel and bonded to the underside of the channel plate 1101; and a nozzle plate 1103 bonded to the upper side of the channel plate 1101. The channel plate 1101, the vibrating plate 102, and the nozzle plate 1104 are arranged so as to form a nozzle 1104 for jetting liquid drops (ink drops), a nozzle connecting channel 1105 leading to the nozzle 1104, a liquid chamber 1106 used as a pressure-generating chamber, a fluid resistance part (supply channel) 1107 for supplying ink to the liquid chamber 1106, and an ink supply opening 1109 leading to a common liquid chamber 1108.

Figure 30:
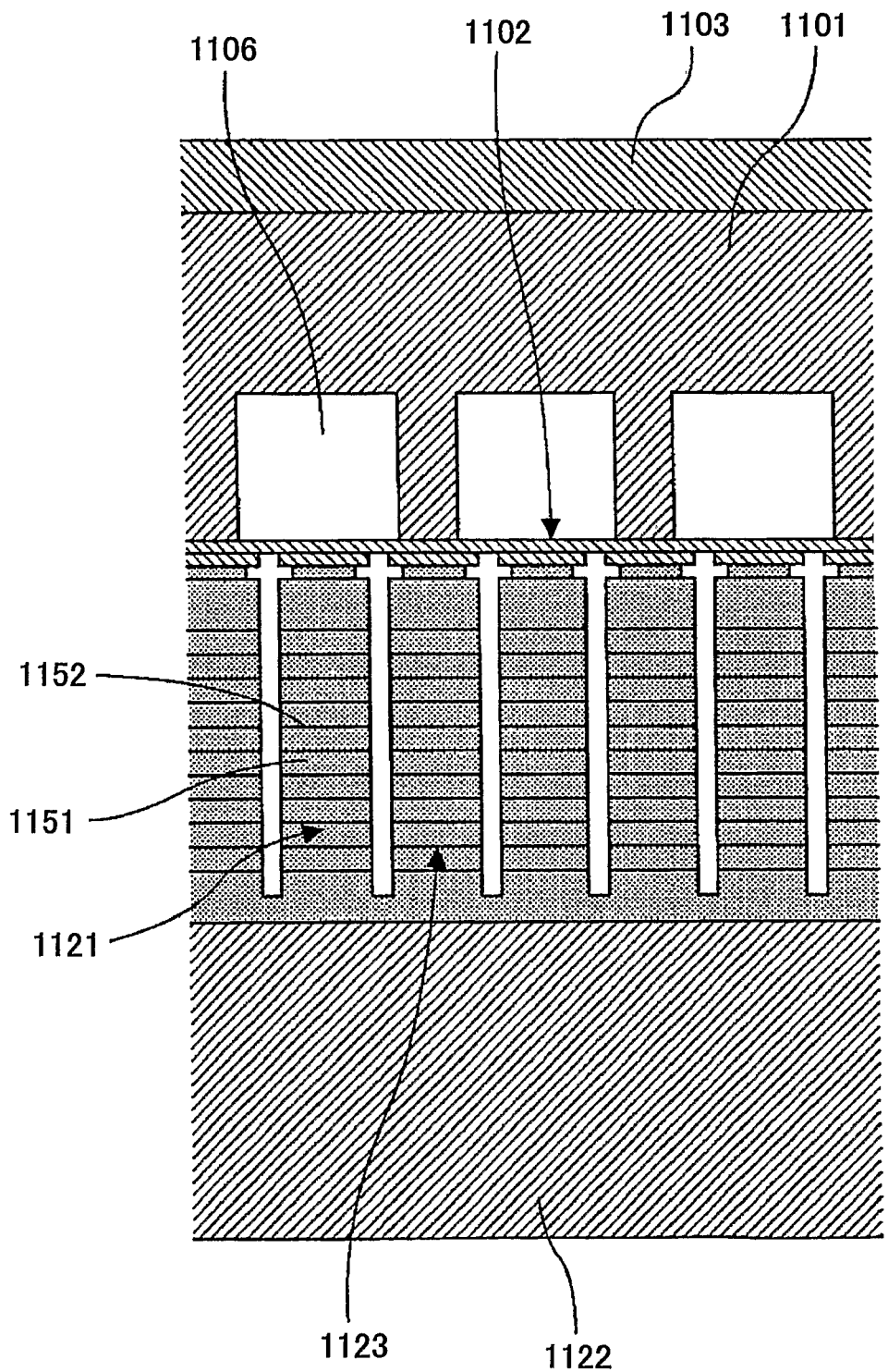
FIG. 30 is a cut-away side view of an inkjet head taken along the width of a liquid chamber (along the direction in which nozzles are arranged)

The exemplary inkjet head also includes two arrays of stacked piezoelectric elements 1121 (only one array is shown in FIG. 30) that are electromechanical conversion elements and used as a pressure-generating unit (actuator unit) to deform the vibrating plate 1102 and thereby to pressurize ink in the liquid chamber 1106; and a base plate 1122 on which the piezoelectric elements 1121 are fixed. Between the piezoelectric elements 1121, supports 1123 are provided. The supports 1123 are formed at the same time when a piezoelectric material is processed to form the piezoelectric elements 1121. Since no driving voltage is applied to the supports 1123, they just function as supporting parts.

An FPC cable 1126 having a driving circuit (driving IC) (not shown) is connected to the piezoelectric elements 1121.

The periphery of the vibrating plate 1102 is bonded to a frame part 1130. The frame part 1130 has a through hole 1131 for housing an actuator unit including the piezoelectric elements 1121 and the base plates 1122, a recess used as the common liquid chamber 1108, and an ink supply hole 1132 for supplying ink from the outside to the common liquid chamber 1108. The frame part 1130 is made of, for example, a thermosetting resin such as an epoxy resin or polyphenylene sulfide and formed by injection molding.

The nozzle connecting channel 1105 and the liquid chamber 1106 in the channel plate 1101 are formed, for example, by anisotropically etching a single-crystal silicon substrate with a crystal orientation (110) using an alkaline etching liquid such as a potassium hydroxide solution (KOH). The material for the channel plate 1101 is not limited to a single-crystal silicon substrate, but a stainless steel substrate, a photosensitive resin, or the like may also be used.

The vibrating plate 1102 is formed, for example, by electroforming a nickel plate. However, the material for the vibrating plate 1102 is not limited to a nickel plate, but other types of metal plates or a laminated plate made of a metal plate and a resin plate may also be used. The piezoelectric elements 1121 and the supports 1123 are bonded to the vibrating plate 1102 with an adhesive, and the vibrating plate 1102 is bonded to the frame part 1130 with an adhesive.

In the nozzle plate 1103, the nozzle 1104 with a diameter of 10-30 μm is formed for each of the liquid chambers 1106. The nozzle plate 1101 is bonded to the channel plate 1101 with an adhesive. The nozzle plate 1103 is made, for example, by forming layers on the surface of a nozzle forming material made of a metal. The top-most layer of the nozzle plate 1103 is made of a water-repellent material. Preferable water-repellent materials are as described above.

The piezoelectric element 1121 is a stacked piezoelectric element (PZT in this embodiment) formed by alternately stacking a piezoelectric material 1151 and an internal electrode 1152. The ends of the internal electrodes 1152 are exposed alternately on one and the other side of the piezoelectric element 1121 and are connected to an individual electrode 1152 and a common electrode 1153. In this embodiment, the exemplary inkjet head is configured so that ink in the liquid chamber 1106 is pressurized by the displacement of the piezoelectric elements 1121 in the upward and downward directions in FIGS. 29 and 30. However, the exemplary inkjet head may be configured to pressurize ink in the liquid chamber 1106 by the displacement of the piezoelectric elements 1121 in the leftward and rightward directions in FIGS. 29 and 30. Also, the exemplary inkjet head may be configured to include one array of piezoelectric elements 1121 on one base plate 1122.

In the exemplary inkjet head configured as described above, when a voltage applied to the piezoelectric element 1121 is decreased below a reference potential, the piezoelectric elements 1121 contract and cause the vibrating plate 1102 to bend downward. As a result, the volume of the liquid chamber 1106 increases, and ink flows into the liquid chamber 1106. When the voltage applied to the piezoelectric elements 1121 is increased, the piezoelectric elements 1121 expand in the direction in which the layers of the piezoelectric elements 1121 are stacked and cause the vibrating plate 1102 to bend toward the nozzle 1104. As a result, the volume of the liquid chamber 1106 decreases, the ink in the liquid chamber 1106 is pressurized, and ink drops are thereby jetted from the nozzle 1104.

When the voltage applied to the piezoelectric element 1121 is returned to the reference potential, the vibrating plate 1102 returns to its initial position, the liquid chamber 1106 expands and thereby generates a negative pressure, and, as a result, ink flows into the liquid chamber 1106 from the common liquid chamber 1108. After the vibration of the meniscus surface in the nozzle 1104 decreases and the meniscus surface becomes stable, the next ink jetting process is started.

The method of driving the exemplary inkjet head is not limited to the method described above.

Figure 31:
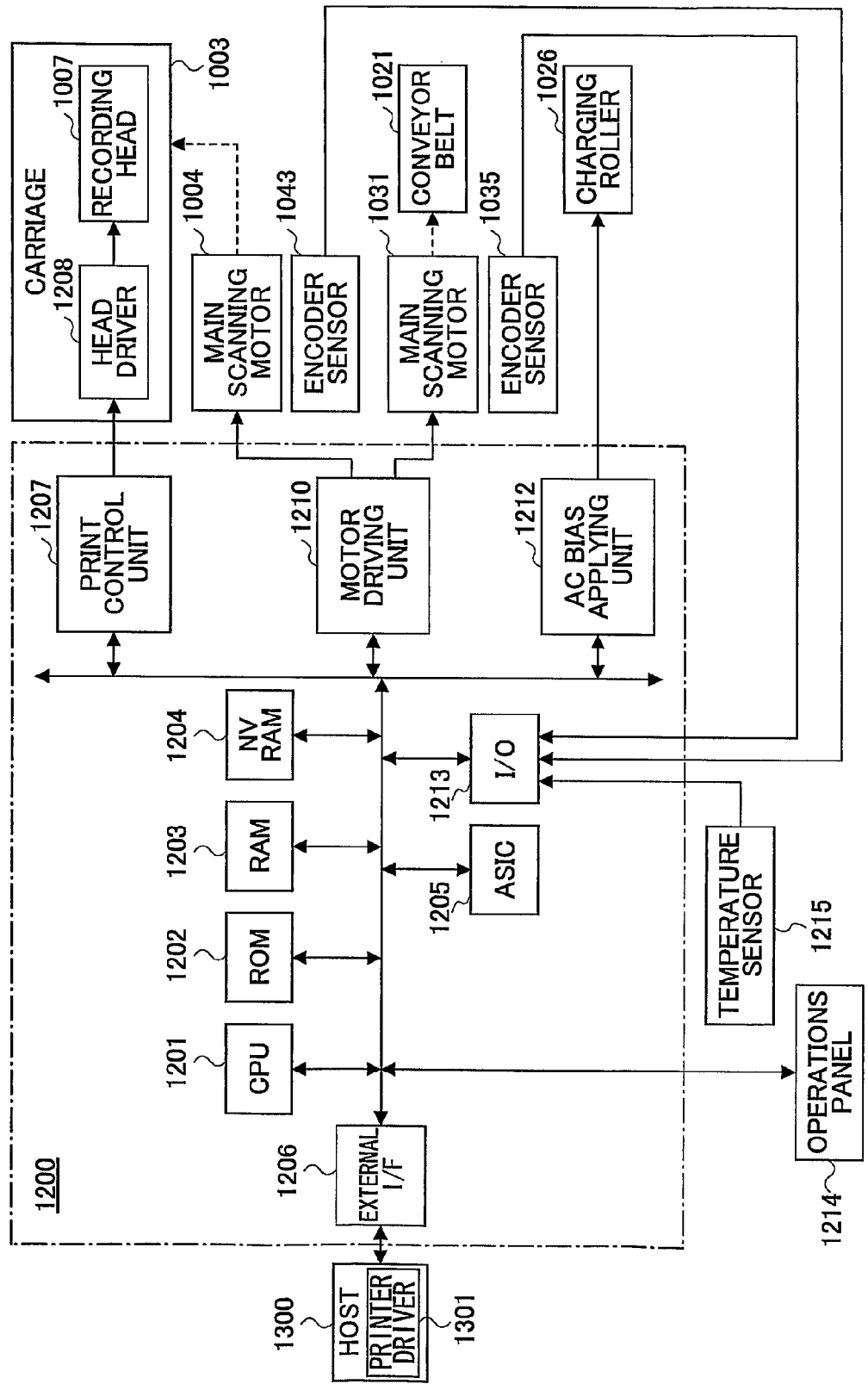
FIG. 31 is a block diagram illustrating an exemplary control unit of an image forming apparatus.

An exemplary control unit of the exemplary image forming apparatus is outlined below with reference to the block diagram shown in FIG. 31.

The control unit 1200 includes a CPU 1201 for controlling the exemplary image forming apparatus, a ROM 1202 for storing programs to be executed by the CPU 1201 and other fixed data, a RAM 1203 for temporarily storing image data, a rewritable non-volatile memory 1204 that retains data even when the power is off, and an ASIC 1205 that performs, for example, signal processing and a sort operation on image data and handles input/output signals for controlling the exemplary image forming apparatus.

The control unit 1200 also includes an external I/F 1206 for sending/receiving data and signals to/from a host 1300, a print control unit 1207 including a data transfer unit for controlling the recording heads 1007 and a drive waveform generating unit for generating drive waveforms, a head driver (driver IC) 1208 for driving the recording heads 1007, a motor driving unit 1210 for driving the main scanning motor 1004 and the sub scanning motor 1031, an AC bias applying unit 1212 for applying an AC bias to the charging roller 1026, and an I/O 1213 for receiving detection signals from encoder sensors 1035 and 1043 and a temperature sensor 1215 that detects an environmental temperature. An operations panel 1214 for inputting and displaying information is connected to the control unit 1200.

The external I/F 1206 of the control unit 1200 receives print data via a cable or a network from an image processing program, such as a printer driver 1301, of the host 1300. The host 1300 may be an information processing apparatus such as a personal computer, an image reading apparatus such as an image scanner, an imaging apparatus such as a digital camera, or the like.

The CPU 1201 of the control unit 1200 reads out and analyzes the print data in a receiving buffer of the external I/F 1206, causes the ASIC 1205 to perform image processing and a sort operation on the print data, and transfers image data generated from the print data via the print control unit 1207 to the head driver 1208. Generation of dot pattern data used for the printing process is performed by the printer driver 1301 of the host 1300 as described later.

The print control unit 1207 transfers the image data as serial data to the head driver 1208. The print control unit 1207 also outputs a transfer clock signal, based on which the image data are transferred, a latch signal, and an ink drop control signal (mask signal) to the head driver 1208. Also, the print control unit 1207 includes a D/A converter for converting drive signal pattern data stored in the ROM 1202 from digital to analog, a drive waveform generating unit including a voltage amplifier and a current amplifier, and a drive waveform selecting unit for selecting a drive waveform to be supplied to the head driver 1208. Thus, the print control unit 1207 is configured to generate a drive waveform made up of one drive pulse (drive signal) or two or more drive pulses (drive signals), and to output the generated drive waveform to the head driver 1208.

The head driver 1208 selectively applies drive pulses constituting the drive waveform supplied from the print control unit 1207 to the piezoelectric elements 1121 according to one line (one scan by the recording heads 1007) of the image data input serially, and thereby drives the recording heads 1007. The recording heads 1007 can form dots of different sizes, for example, a large-size dot, a medium-size dot, and a small-size dot, according to a drive pulse selected.

The CPU 1201 calculates a drive output value (control value) for the main scanning motor 1004 based on speed detection and position detection values obtained by sampling a detection pulse from the encoder sensor 1043 constituting a linear encoder and speed target and position target values obtained from a stored speed and position profile, and causes the motor driving unit 1210 to drive the main scanning motor 1004 based on the calculated control value. Also, the CPU 1201 calculates a drive output value (control value) for the sub scanning motor 1031 based on speed detection and position detection values obtained by sampling a detection pulse from the encoder sensor 1035 constituting a rotary encoder and speed target and position target values obtained from a stored speed and position profile, and causes the motor driving unit 1210 to drive the sub scanning motor 1031 based on the calculated control value.

Figure 32:
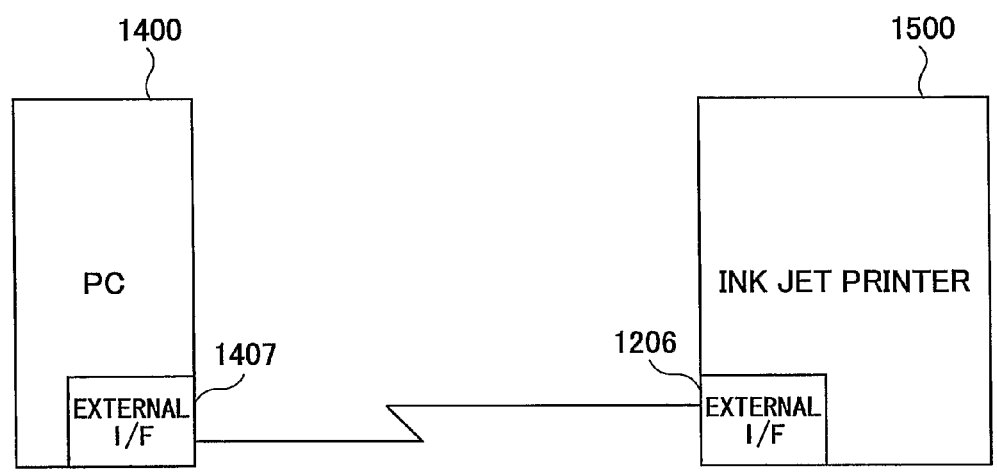
FIG. 32 is a block diagram illustrating an exemplary image forming system according to an embodiment of the present invention.

An exemplary image forming system including an exemplary image processing apparatus according to an embodiment of the present invention and the above exemplary image forming apparatus is described below with reference to FIG. 32. The exemplary image processing apparatus includes a program for causing a computer to perform an image forming method of an embodiment of the present invention.

In the descriptions below, an inkjet printer (inkjet recording apparatus) is used as the exemplary image forming apparatus.

The exemplary image forming system includes one or more image processing apparatuses 1400 implemented by, for example, personal computers (PC) and an inkjet printer 1500 connected to the image processing apparatuses 1400 via interfaces or a network.

Figure 33:
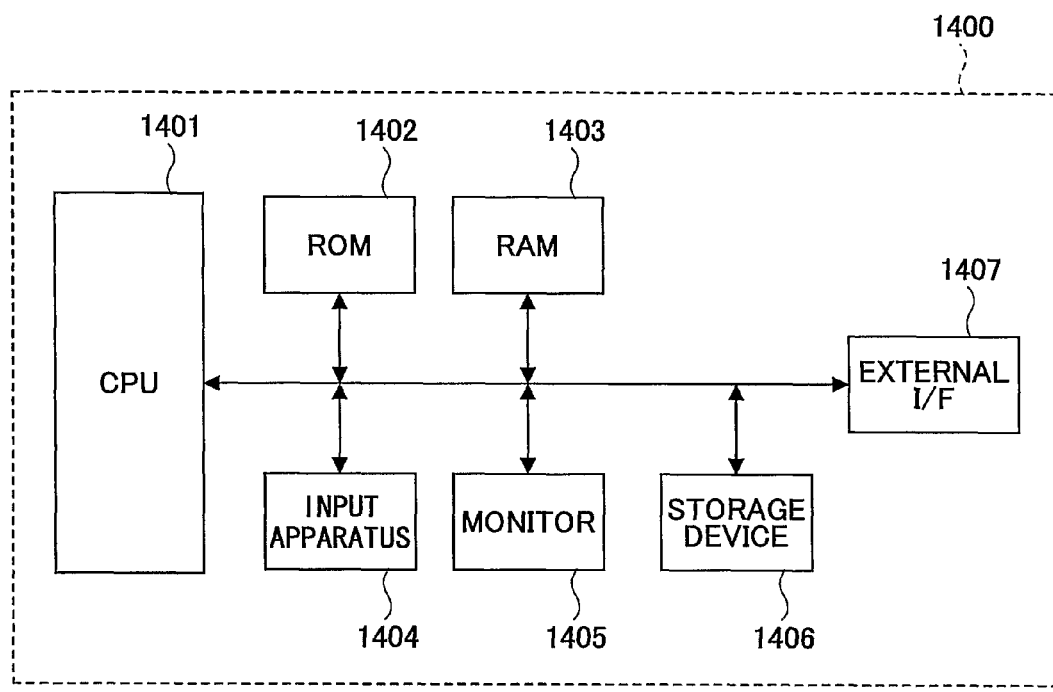
FIG. 33 is a block diagram illustrating an exemplary image processing apparatus of the exemplary image forming system.

In the image processing apparatus 1400, as shown in FIG. 33, a CPU 1401, and a ROM 1402 and a RAM 1403 used as memories are connected by a bus. Also, a storage device 1406 implemented by a magnetic storage device such as a hard disk, an input apparatus 1404 including a mouse and a keyboard, a monitor 1405 such as an LCD or a CRT, and a storage medium reading device (not shown) for reading a storage medium such as an optical disk are connected via interfaces to the bus. Further, an external interface (I/F) 1407 for communicating with devices connected, for example, via a USB or a network such as the Internet is connected to the bus.

The storage device 1406 of the image processing apparatus 1400 stores image processing programs including a program of an embodiment of the present invention. The image processing programs are read from a storage medium by the storage medium reading apparatus or downloaded from a network such as the Internet, and installed in the storage device 1406. The image processing programs enable the image processing apparatus 1400 to perform image processing as described below. The image processing programs may be configured to run on an operating system. Also, the image processing programs may be a part of an application program.

Figure 34:
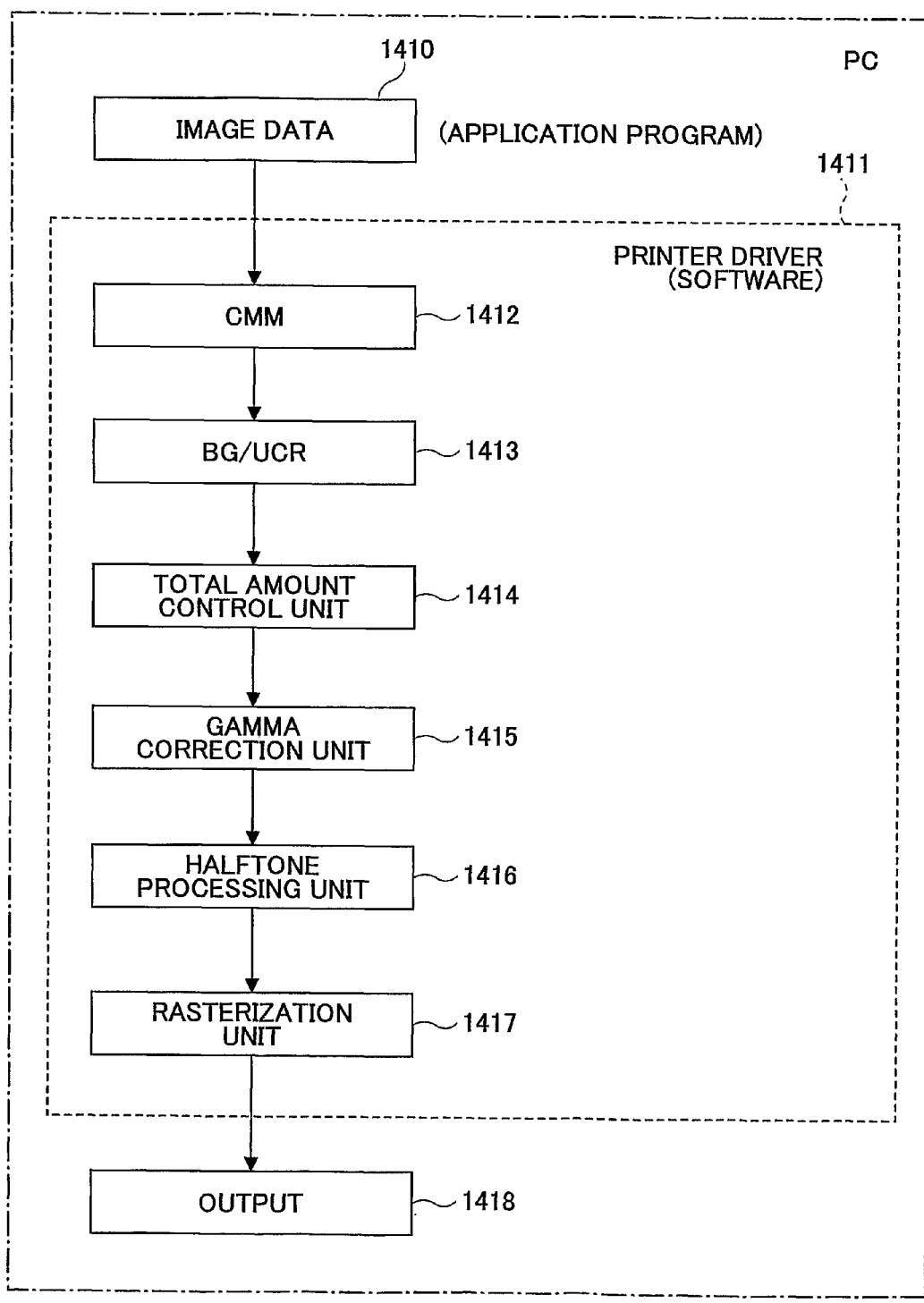
FIG. 34 is a block diagram illustrating an exemplary functional configuration of a printer driver.

FIG. 34 is a block diagram illustrating an exemplary functional configuration of an image processing program (printer driver) that runs on the image processing apparatus 1400 and performs an image processing method according to an embodiment of the present invention.

A printer driver 1411 of the image processing apparatus 1400 includes a color management module (CMM) unit 1412 that converts the color space of image data 1410, which are provided, for example, from an application program, from the one for monitor display to the one for an image forming apparatus (from an RGB color system to a CMY color system); a black generation/under color removal (BG/UCR) unit 1413 for performing a black generation/under color removal process on CMY values; a total amount control unit 1414 that corrects a CMYK signal, which is used as a record control signal, according to the maximum total amount of ink per unit area specified in an image forming apparatus; a gamma correction unit 1415 that corrects input/output data according to the characteristics of an image forming apparatus or user preference; a zooming unit (not shown) that enlarges an image according to the resolution of an image forming apparatus; a halftone processing unit 1416 including multi-valued and single-valued matrices for converting image data to dot pattern data to be formed by recording heads; and a rasterization unit 1417 that divides the dot pattern data from the halftone processing unit 1416 into portions each portion corresponding to one scan and assigns dots in each portion of the dot pattern data to the corresponding nozzles of recording heads. An output 1418 from the rasterization unit 1417 is sent to the inkjet printer 1500.

Figure 35:
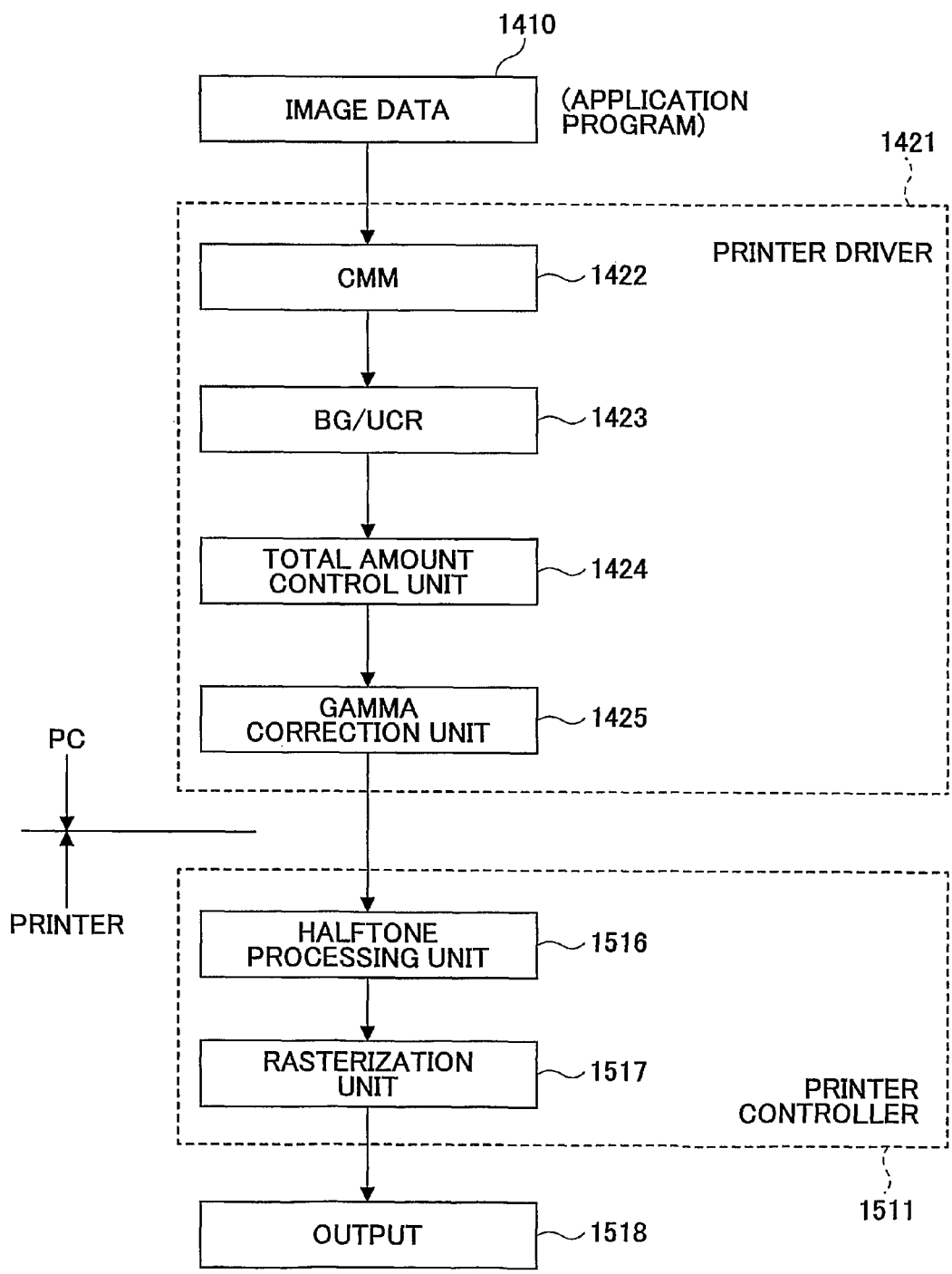
FIG. 35 is a block diagram illustrating another exemplary functional configuration of a printer driver.

Any part of the above image processing may be performed on the inkjet printer 1500. FIG. 35 is a block diagram illustrating another exemplary functional configuration of a printer driver according to an embodiment of the present invention.

As shown in FIG. 35, a printer driver 1421 of the image processing apparatus 1400 includes a CMM unit 1422, a BG/UCR unit 1423, a total amount control unit 1424, and a gamma correction unit 1425 that have substantially the same functions as the corresponding units shown in FIG. 34. The printer driver 1421 sends processed image data to the inkjet printer 1500.

A printer controller 1511 (control unit 1200) of the inkjet printer 1500 includes a zooming unit (not shown) that enlarges an image according to the resolution of an image forming apparatus; a halftone processing unit 1516 including multi-valued and single-valued matrices for converting image data to dot pattern data to be formed by recording heads; and a rasterization unit 1517 that divides the dot pattern data from the halftone processing unit 1516 into portions each portion corresponding to one scan and assigns dots in each portion of the dot pattern data to the corresponding nozzles of recording heads. An output 1518 from the rasterization unit 1517 is sent to the print control unit 1207.

Either the printer driver 1411 shown in FIG. 34 or the combination of the printer driver 1421 and the printer controller 1511 shown in FIG. 35 may be used for an image processing method according to an embodiment of the present invention. In the descriptions below, it is assumed that the inkjet printer 1500 does not include functions to generate dot pattern data from print data.

In other words, print data from, for example, an application program being executed on the image processing apparatus 1400 are converted into multi-valued dot pattern data (print image data) that can be printed on the ink jet printer 1500 and then rasterized by the printer driver 1411 of the image processing apparatus 1400. The rasterized dot pattern data are sent to the inkjet printer 1500 and printed.

In the image processing apparatus 1400, for example, image or character print data (for example, data describing the position, thickness, and shape of a line to be recorded; or data describing the font, size, and position of a characters to be recorded) from an application program or an operating system are temporarily stored in a draw data memory. The print data are written in a page description language.

The print data stored in the draw data memory are analyzed by a rasterizer. When the print data are to print a line, the print data are converted into dot pattern data according to the position and thickness of the line described in the print data. When the print data are to print a character, the print data are converted into dot pattern data according to the position and thickness of the character described in the print data by retrieving corresponding outline font data stored in the image processing apparatus 1400. When the print data are to print an image, the print data are directly converted into dot pattern data.

After the conversion, image processing is performed on the dot pattern data (image data 1410) and the processed dot pattern data are stored in a raster data memory. Then, the processed dot pattern data are rasterized by the image processing apparatus 1400 using an orthogonal grid to determine the coordinates. As described above, image processing includes color management processing (by a CMM), gamma correction processing, halftone processing such as dithering and error diffusion, under color removal, and total amount control. The dot pattern data stored in the raster data memory are sent via an interface to the inkjet printer 1500.

Figure 36:
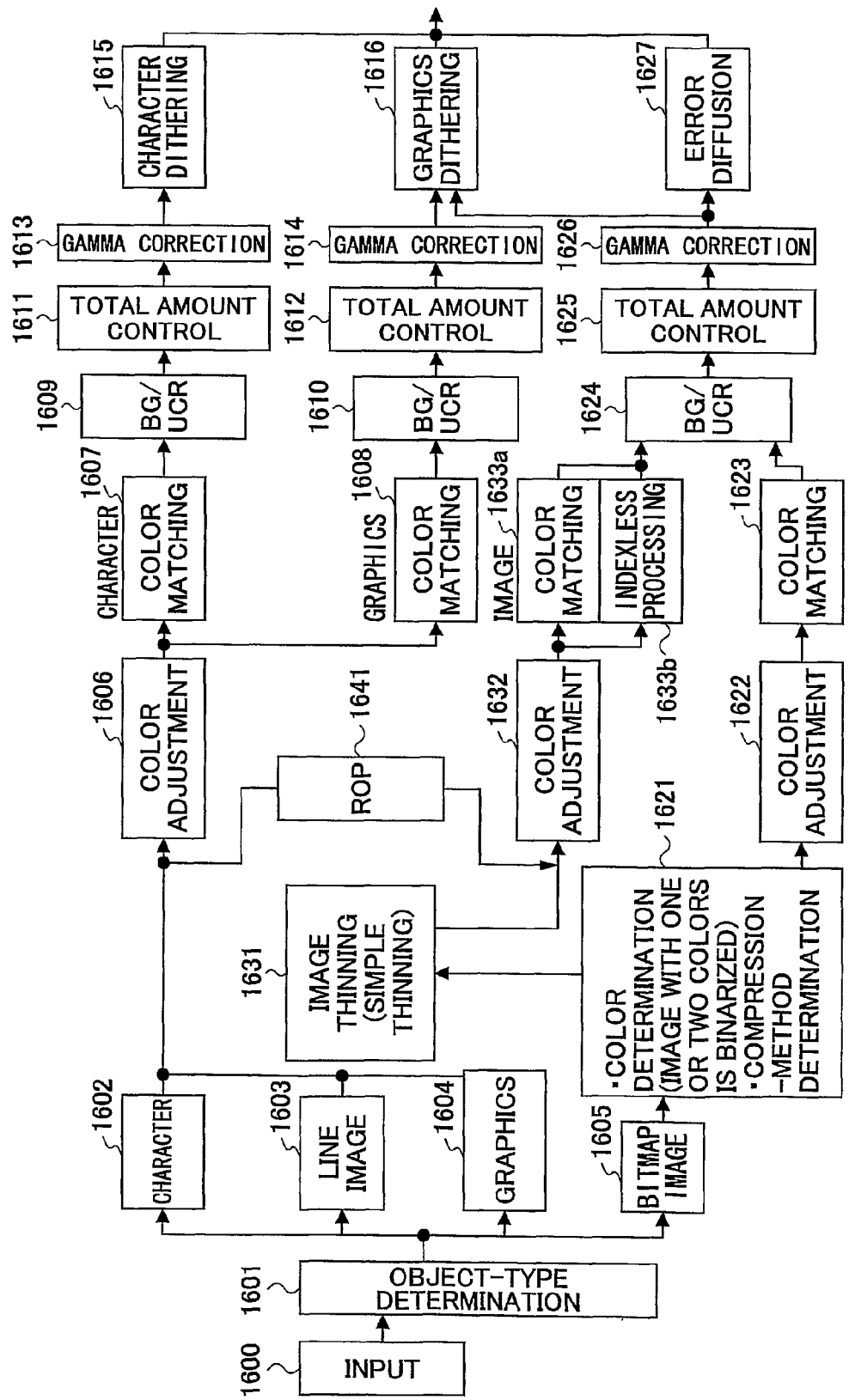
FIG. 36 is a block diagram illustrating exemplary image processing by a printer driver.

Exemplary image processing performed by the printer driver 1411 of the image processing apparatus 1400 is described below with reference to a block diagram shown in FIG. 36.

When a print command is output from an application program running on a data processing apparatus such as a personal computer, the printer driver 1411, in an object-type determining step 1601, determines the types of objects in an input (print data) 1600 of the print command. Each of the objects, character image data 1602, line image data 1603, graphics image data 1604, and bitmap image data 1605, is processed through a corresponding processing path.

As a first step, a color adjusting step 1606 is performed on the character image data 1602, the line image data 1603, and the graphics image data 1604. Then, a color matching step 1607, a BG/UCR step 1609, a total amount control step 1611, a gamma correction step 1613, and a character dithering (halftone processing) step 1615 are further-performed on the character image data 1607. For the line image data 1603 and the graphics image data 1604, a color matching step 1608, a BG/UCR step 1610, a total amount control step 1612, a gamma correction step 1614, and a graphics dithering (halftone processing) step 1616 are further performed.

For the bitmap image data 1605, a color and compression-method determining step 1621 is first performed. When the bitmap image data 1605 have more than two colors, a color adjusting step 1622, a color matching step 1623, a BG/UCR step 1624, a total amount control step 1625, a gamma correction step 1626, and an error diffusion (halftone processing) step 1627 are further performed. When the bitmap image data 1605 have one or two colors, an image thinning step 1631, a color adjusting step 1632, a color matching step 1633*a* or an indexless processing step 1633*b* (processing where no color matching is performed), the BG/UCR step 1624, the total amount control step 1625, the gamma correction step 1626, and the error diffusion (halftone processing) step 1627 are further performed.

Also, the line image data 1603 and the graphics image data 1604 may be processed through a different processing path that branches to an ROP step 1641. In this case, following the ROP step 1641, the color adjusting step 1632 and the subsequent steps are performed on the line image data 1603 and the graphics image data 1604.

After the above processing, all the objects are combined again into a single set of image data; a rasterizing step (not shown) is performed on the combined image data, and the rasterized image data are sent to an image forming apparatus.

An embodiment of the present invention provides an inkjet recording apparatus that can form a high-resolution, high-quality image without causing problems such as beading and bleeding.

An embodiment of the present invention provides a pigmented ink for inkjet recording having excellent fixation even on a commercial printing paper.

An embodiment of the present invention provides an image processing method that makes it possible to use a concentration-type dot arrangement order or a dispersion-type dot arrangement order depending on an output halftone level and thereby to form a high-quality image even on a commercial printing paper.

Still another embodiment of the present invention provides a storage medium containing an image processing program for performing an image processing method according to an embodiment of the present invention. An apparatus including such a storage medium, in other words, having such an image processing program as a print driver, makes it possible to form a high-quality image even on a commercial printing paper.

The present invention is not limited to the specifically disclosed embodiments, and variations and modifications may be made without departing from the scope of the present invention.

The present application is based on Japanese Priority Application No. 2006-103139 filed on Apr. 4, 2006, and Japanese Priority Application No. 2007-092191 filed on Mar. 30, 2007, the entire contents of which are hereby incorporated herein by reference.

The invention claimed is:

1. An inkjet recording apparatus for performing recording by jetting a recording liquid onto a recording medium, comprising:
   an image processing unit configured to obtain an output halftone level by performing halftone processing on input image data, to select a dot arrangement order according to the obtained output halftone level, and thereby to generate dot data where dots are arranged in a grid-like pattern;
   wherein the inkjet recording apparatus is configured to use a pigmented ink as the recording liquid when the recording medium is a commercial printing paper, and to record the dots in a staggered arrangement where positions of the dots in odd/even-numbered columns or odd/even-numbered rows in the dot data are shifted in a sub-scanning direction or in a main-scanning direction.

2. The inkjet recording apparatus as claimed in claim 1, wherein resolution of the dot data is 400 dpi or higher.

3. The inkjet recording apparatus as claimed in claim 1, wherein
   the recording medium includes a base material and a coating layer on at least one side of the base material;
   amount of pure water transferred onto the recording medium, after a contact time of 100 ms in an environmental condition of 23° C. and 50% RH, is between 2 and 35 ml/m$^2$; and
   amount of pure water transferred onto the recording medium, after a contact time of 400 ms in an environmental condition of 23° C. and 50% RH, is between 3 and 40 ml/m$^2$.

4. The inkjet recording apparatus as claimed in claim 3, wherein a solid content of the coating layer on the base material is between 0.5 and 20.0 g/m$^2$.

5. The inkjet recording apparatus as claimed in claim 3, wherein the recording medium contains kaolin as a pigment.

6. The inkjet recording apparatus as claimed in claim 3, wherein the recording medium contains heavy calcium carbonate as a pigment.

7. The inkjet recording apparatus as claimed in claim 3, wherein the recording medium contains a water-based resin.

8. The inkjet recording apparatus as claimed in claim 7, wherein the water-based resin is a water-soluble resin or a water-dispersible resin.

9. The inkjet recording apparatus as claimed in claim 1, wherein the pigmented ink contains at least water, a colorant, and a humectant.

10. The inkjet recording apparatus as claimed in claim 9, wherein a surface tension of the pigmented ink is 35 mN/m or lower at a temperature of 25° C.

11. The inkjet recording apparatus as claimed in claim 9, wherein a viscosity of the pigmented ink is between 1 and 20 cp at a temperature of 25° C.

12. The inkjet recording apparatus as claimed in claim 9, wherein the pigmented ink contains a fluorinated surfactant.

13. The inkjet recording apparatus as claimed in claim 1, wherein
   the image processing unit is configured to use a dither matrix for the halftone processing;
   the dither matrix is designed to convert the input image data having M input halftone levels into output image data having N (M>N>2) output halftone levels, and includes multiple submatrices that are arranged at a screen angle without overlap and without leaving space in the dither matrix so that output pixels form a halftone dot pattern or screen lines; and
   the image processing unit is also configured to use concentration-type submatrices with a concentration-type dot arrangement order as the submatrices for an output halftone level that is lower than a threshold level T (N>T>1) so that dots are formed close to each other, and to use dispersion-type submatrices with a dispersion-type dot arrangement order as the submatrices for an output halftone level that is equal to or higher than the threshold level T so that dots are formed dispersively.

14. The inkjet recording apparatus as claimed in claim 1, wherein the image processing unit is configured to use an error diffusion method for the halftone processing which error diffusion method employs an error diffusion algorithm designed to convert the input image data having M input halftone levels into output image data having N (M>N≧2) output halftone levels.

15. An image processing method of processing input image data for recording by the inkjet recording apparatus as claimed in claim 1, comprising the steps of:
   obtaining an output halftone level by performing halftone processing on the input image data; and
   selecting a dot arrangement order according to the obtained output halftone level; wherein
   a dither matrix is used for the halftone processing which dither matrix is designed to convert the input image data having M input halftone levels into output image data having N (M>N>2) output halftone levels;
   the dither matrix includes multiple submatrices that are arranged at a screen angle without overlap and without leaving space in the dither matrix so that output pixels form a halftone dot pattern or screen lines;
   concentration-type submatrices with a concentration-type dot arrangement order are used as the submatrices for an output halftone level that is lower than a threshold level T (N>T>1) so that dots are formed close to each other; and
   dispersion-type submatrices with a dispersion-type dot arrangement order are used as the submatrices for an output halftone level that is equal to or higher than the threshold level T so that the dots are formed dispersively.

16. A non-transitory storage medium having an image processing program embodied therein for causing a computer to perform the image processing method as claimed in claim 15.

* * * * *